United States Patent
Weiss et al.

(10) Patent No.: US 11,112,807 B1
(45) Date of Patent: Sep. 7, 2021

(54) METHOD FOR DETERMINING SELF-DRIVING VEHICLE BEHAVIOR MODELS, A SELF-DRIVING VEHICLE, AND A METHOD OF NAVIGATING A SELF-DRIVING VEHICLE

(71) Applicant: Piaggio Fast Forward, Inc., Boston, MA (US)

(72) Inventors: Mitchell Weiss, Carlisle, MA (US); Jeffrey Schnapp, Cambridge, MA (US); Gregory Stewart Lynn, Venice, CA (US); Rossitza Kotelova, Cambridge, MA (US)

(73) Assignee: PIAGGIO FAST FORWARD, INC., Boston, MA (US)

( * ) Notice: Subject to any disclaimer, the term of this patent is extended or adjusted under 35 U.S.C. 154(b) by 0 days.

(21) Appl. No.: 17/049,141

(22) PCT Filed: May 1, 2019

(86) PCT No.: PCT/US2019/030208
§ 371 (c)(1),
(2) Date: Oct. 20, 2020

(87) PCT Pub. No.: WO2019/213264
PCT Pub. Date: Nov. 7, 2019

Related U.S. Application Data

(60) Provisional application No. 62/665,183, filed on May 1, 2018.

(51) Int. Cl.
*G05D 1/12* (2006.01)
*G05D 1/02* (2020.01)
*G05D 1/00* (2006.01)

(52) U.S. Cl.
CPC ............ *G05D 1/12* (2013.01); *G05D 1/0088* (2013.01); *G05D 1/0094* (2013.01); *G05D 1/0212* (2013.01); *G05D 2201/0216* (2013.01)

(58) Field of Classification Search
CPC .. G05D 1/0088; G05D 1/0094; G05D 1/0212; G05D 1/12; G05D 2201/0216
See application file for complete search history.

(56) References Cited

U.S. PATENT DOCUMENTS

| | | |
|---|---|---|
| 282,299 A | 7/1883 | Freeman |
| 1,819,924 A | 8/1931 | Seppol |

(Continued)

FOREIGN PATENT DOCUMENTS

| | | |
|---|---|---|
| CN | 102008379 | 4/2011 |
| CN | 104590476 | 5/2015 |

(Continued)

OTHER PUBLICATIONS

International Preliminary Report on Patentability dated Feb. 26, 2021 issued in corresponding International Application No. PCT/US2019/030208.

(Continued)

*Primary Examiner* — Dale Moyer
(74) *Attorney, Agent, or Firm* — Onello & Mello, LLP

(57) ABSTRACT

Provided is a method of modeling behavior for a self-driving vehicle, e.g., as a follower vehicle. Also provided is a vehicle configured to execute the behavior model to cooperatively navigate at least one structural element in an environment. The structural element can be or include a door, a vestibule, and/or an elevator, as examples. The behavior model can be formed by a method that includes tracking and measuring leader-follower interactions and actions with at least one structural element of an environment, representing the leader behaviors and the follower (Continued)

behavior in a behavior model, and electronically storing the behavioral model. The leader-follower interactions and actions can include leader behaviors and follower behaviors, including starts, stops, pauses, and movements of the leader, follower vehicle, and/or objects.

26 Claims, 9 Drawing Sheets

(56) References Cited

U.S. PATENT DOCUMENTS

| | | | |
|---|---|---|---|
| 3,123,173 | A | 3/1964 | Jacobs |
| 3,418,005 | A | 12/1968 | Allina |
| 3,776,353 | A | 12/1973 | Roth |
| 3,858,673 | A | 1/1975 | Browning |
| 3,921,740 | A | 11/1975 | Forster |
| 4,179,006 | A | 12/1979 | Lenack et al. |
| 4,222,452 | A | 9/1980 | Fachini et al. |
| 4,714,140 | A | 12/1987 | Hatton et al. |
| 4,986,387 | A | 1/1991 | Thompson et al. |
| 5,094,375 | A | 3/1992 | Wright |
| 5,248,011 | A | 9/1993 | Richards |
| 5,261,684 | A | 11/1993 | Soto |
| 5,322,140 | A | 6/1994 | Bussinger |
| 5,343,974 | A | 9/1994 | Rabek |
| 5,558,174 | A | 9/1996 | Avitan et al. |
| 5,818,189 | A | 10/1998 | Uchiyama et al. |
| 6,260,645 | B1 | 7/2001 | Pawlowski et al. |
| 6,328,125 | B1 | 12/2001 | Van Den Brink et al. |
| 6,880,654 | B2 | 4/2005 | Plishner |
| 6,974,399 | B2 | 12/2005 | Lo |
| 7,017,696 | B2 | 3/2006 | Pal |
| 7,124,854 | B2 | 10/2006 | Huang |
| 7,185,726 | B2 | 3/2007 | Young |
| 7,337,862 | B1 | 3/2008 | Greenley et al. |
| 7,841,435 | B2 | 11/2010 | Raue |
| 7,938,210 | B2 | 5/2011 | Kunzler et al. |
| 7,996,109 | B2 | 8/2011 | Zini et al. |
| 7,997,361 | B1 | 8/2011 | Bell et al. |
| 8,002,060 | B2 | 8/2011 | Komatsu |
| 8,083,013 | B2 | 12/2011 | Bewley et al. |
| 8,096,378 | B2 | 1/2012 | Xie |
| 8,123,237 | B2 | 2/2012 | Takemura |
| 8,160,794 | B2 | 4/2012 | Fuwa |
| 8,170,781 | B2 | 5/2012 | Fuwa |
| 8,186,467 | B2 | 5/2012 | Yoshino et al. |
| 8,490,723 | B2 | 7/2013 | Heinzmann et al. |
| 8,684,123 | B2 | 4/2014 | Chen |
| 8,807,250 | B2 | 8/2014 | Chen |
| 8,807,254 | B2 | 8/2014 | Manus |
| 8,932,170 | B2 | 1/2015 | Ishizuka |
| 8,985,264 | B2 | 3/2015 | Shirley |
| 9,010,474 | B2 | 4/2015 | Martinelli et al. |
| 9,045,190 | B2 | 6/2015 | Chen |
| 9,101,817 | B2 | 8/2015 | Doerksen |
| 9,364,766 | B2 | 6/2016 | Mielniczek |
| 9,511,811 | B2 | 12/2016 | Andreev |
| 9,557,740 | B2 | 1/2017 | Crawley |
| 9,630,447 | B2 | 4/2017 | Yoshino et al. |
| 9,701,012 | B1 | 7/2017 | Theobald |
| 9,764,592 | B1 | 9/2017 | Hays et al. |
| 9,776,327 | B2 | 10/2017 | Pinter et al. |
| 9,789,017 | B2 | 10/2017 | Hays et al. |
| 9,849,047 | B2 | 12/2017 | Hays et al. |
| 10,076,954 | B2 | 9/2018 | Burtov et al. |
| 10,093,168 | B2 | 10/2018 | Hays et al. |
| 10,173,738 | B2 | 1/2019 | Schnapp et al. |
| 10,223,848 | B2 | 3/2019 | Browning et al. |
| 10,293,676 | B2 | 5/2019 | Schnapp et al. |
| 2001/0042650 | A1 | 11/2001 | Van Den Berg |
| 2002/0011368 | A1 | 1/2002 | Berg |
| 2002/0149172 | A1 | 10/2002 | Field et al. |
| 2004/0124023 | A1 | 7/2004 | Plishner |
| 2004/0182625 | A1 | 9/2004 | Pal |
| 2005/0016785 | A1 | 1/2005 | Young |
| 2005/0056479 | A1 | 3/2005 | Huang |
| 2005/0176542 | A1 | 8/2005 | Lo |
| 2006/0254841 | A1 | 11/2006 | Strong |
| 2007/0129849 | A1 | 6/2007 | Zini et al. |
| 2008/0041654 | A1 | 2/2008 | Raue |
| 2008/0230285 | A1 | 9/2008 | Bewley et al. |
| 2008/0245593 | A1 | 10/2008 | Kim |
| 2009/0166112 | A1 | 7/2009 | Yoshino et al. |
| 2009/0315286 | A1 | 12/2009 | Takemura |
| 2009/0319124 | A1 | 12/2009 | Fuwa |
| 2010/0057319 | A1 | 3/2010 | Inaji et al. |
| 2010/0070132 | A1 | 3/2010 | Doi |
| 2010/0161206 | A1 | 6/2010 | Takashi |
| 2010/0168993 | A1 | 7/2010 | Doi et al. |
| 2010/0252338 | A1 | 10/2010 | Xie |
| 2011/0010066 | A1 | 1/2011 | Fuwa |
| 2011/0208357 | A1* | 8/2011 | Yamauchi ............ G05D 1/024 700/258 |
| 2011/0209929 | A1 | 9/2011 | Heinzmann et al. |
| 2011/0220427 | A1 | 9/2011 | Chen |
| 2011/0303035 | A1 | 12/2011 | Niebergall et al. |
| 2013/0032423 | A1 | 2/2013 | Chen |
| 2013/0069420 | A1 | 3/2013 | Manus |
| 2013/0228385 | A1 | 9/2013 | Chen |
| 2014/0011625 | A1 | 1/2014 | Thompson |
| 2014/0116799 | A1 | 5/2014 | Pettigrew et al. |
| 2014/0131126 | A1 | 5/2014 | Martinelli et al. |
| 2014/0230602 | A1 | 8/2014 | Shirley |
| 2014/0326525 | A1 | 11/2014 | Doerksen |
| 2015/0012163 | A1 | 1/2015 | Crawley |
| 2015/0093956 | A1 | 4/2015 | Mielniczek |
| 2016/0031515 | A1 | 2/2016 | Andreev |
| 2016/0068056 | A1 | 3/2016 | Burtov et al. |
| 2016/0229058 | A1 | 8/2016 | Pinter et al. |
| 2016/0303900 | A1 | 10/2016 | Yoshino et al. |
| 2016/0325585 | A1 | 11/2016 | Hays et al. |
| 2016/0346142 | A1 | 12/2016 | Hays et al. |
| 2018/0009311 | A1 | 1/2018 | Hays et al. |
| 2018/0082502 | A1 | 3/2018 | Browning et al. |
| 2018/0105033 | A1 | 4/2018 | Schnapp et al. |
| 2018/0105215 | A1 | 4/2018 | Schnapp et al. |
| 2018/0230285 | A1 | 8/2018 | Bueno Lopez et al. |
| 2018/0237065 | A1 | 8/2018 | Yamamoto et al. |
| 2019/0031017 | A1 | 1/2019 | Hays et al. |
| 2020/0047826 | A1 | 2/2020 | Schnapp et al. |

FOREIGN PATENT DOCUMENTS

| | | |
|---|---|---|
| DE | 202007011698 | 1/2009 |
| EP | 0705724 | 4/1996 |
| EP | 1889743 | 6/2008 |
| EP | 2058216 | 5/2009 |
| GB | 2516619 | 2/2015 |
| JP | 59195965 | 12/1984 |
| JP | 57760 | 2/1993 |
| JP | H0692273 | 4/1994 |
| JP | 06134049 | 5/1994 |
| JP | 06061680 | 8/1994 |
| JP | 09215713 | 8/1997 |
| JP | 2000502636 | 3/2000 |
| JP | 2000355293 | 12/2000 |
| JP | 2001339812 | 12/2001 |
| JP | 2004129435 | 4/2004 |
| JP | 2006116186 | 5/2006 |
| JP | 2006123854 | 5/2006 |
| JP | 3993883 | 10/2007 |
| JP | 2007313980 | 12/2007 |
| JP | 2008055951 | 3/2008 |
| JP | 2009040379 | 2/2009 |
| JP | 2012122250 | 6/2012 |
| JP | 2014519446 | 8/2014 |
| JP | 2019003540 | 1/2019 |
| KR | 101272035 | 6/2013 |
| WO | 0115962 | 3/2001 |
| WO | 03065963 | 8/2003 |
| WO | 2008067822 | 6/2008 |
| WO | 2011107674 | 9/2011 |
| WO | 2018075013 | 4/2018 |

(56) References Cited

FOREIGN PATENT DOCUMENTS

| WO | 2018140071 | 8/2018 |
|---|---|---|
| WO | 2019075002 | 4/2019 |
| WO | 2019213264 | 11/2019 |

OTHER PUBLICATIONS

Japanese Office Action dated Dec. 1, 2020 issued in corresponding Japanese Application No. 2019-521784 (with English translation.
Japanese Office Action dated Feb. 2, 2021 issued in corresponding Japanese Application No. 2019-540385, with machine translation to English.
Japanese Office Action dated Jun. 8, 2021 issued in corresponding Japanese Application No. 2021-510268, with English summary.
International Search Report and Written Opinion dated Jul. 22, 2019 issued in corresponding International Application No. PCT/US2019/030208.
European Office Action dated Nov. 4, 2020 issued in corresponding European Application No. 17725412.5.
International Preliminary Report on Patentability dated Aug. 8, 2019 issued in corresponding International Application No. PCT/US2017/031944.
International Search Report and Written Opinion dated Oct. 24, 2017, issued in the corresponding International Search Report and Written Opinion application No. PCT/US2017/031944.
Beroud, Annick. "L'intralogistique au service de la performance" a la matinale de l'Aslog (with English machine translation) L'antenne, Sep. 27, 2016. Retrieved from URL: http://www.lantenne.com/L-intralogistique-au-service-de-la-performance-a-la-matinale-de-l-Aslog_a33383.html.
Goher, K. M., et al. Dynamic Modeling and Control of a Two Wheeled Robotic Vehicle With a Virtual Payload, ARPN Journal of Engineering and Applied Sciences, vol. 6, No. 3, Mar. 2011.
Hay, Benjamin. TwinswHeel, le livreur de colis de demain? (with English machine translation) Tumblr French IoT, Oct. 6, 2016. Retrieved from URL: http://french-iot.tumblr.com/post/151417346436/twinswheel-le-livreur-de-colis-de-demain-la.
Hu, J., & Yan, G. (2014). Analysis of two-wheeled self-balancing mobile robots based on ADRC. Jidian Gongcheng/Mechanical & Electrical Engineering Magazine, 31(2), 159-164. doi:http://dx.doi.org/10.3969/j.ssn.1001-4551.2014.02.006—Abstract Only.
Huang et al., "Modeling and Velocity Control for a Novel Narrow Vehicle Based on Mobile Wheeled Inverted Pendulum", IEEE Transactions on Control Systems Technology, vol. 21 No. 5, Sep. 2013, pp. 1607-1617. (Year: 2013).
Huang et al., "Nonlinear Disturbance Observer-Based Dynamic Surface Control of Mobile Wheeled Inverted Pendulum", IEEE Transactions on Control Systems Technology, vol. 23 No. 6, Nov. 2015, pp. 2400-2407. (Year: 2015).
International Search Report and Written Opinion dated Feb. 20, 2017 issued in corresponding International Application No. PCT/US2016/057529.
Ji, P., Zhu, Y., Cheng, C. et al. (2014). Design of self-balancing two-wheeled vehicle control system based on STM32. Dianzi Keji—Electronic Science and Technology, 27(11), 96-99, 105. Retrieved from http://search.proquest.com/docview/1651444797?accountid=10920—Abstract Only.
Larimi, S. R., Zarafshan, P., & Moosavian, S. A. A. A new stabilization algorithm for a two-wheeled mobile robot aided by reaction wheel. Journal of Dynamic Systems, Measurement, and Control (Transactions of the ASME), vol. 137, No. 1, Jan. 2015.
Libeskind, Jerome. A quoi ressemblera le dernier kilometre dans 10 ans? (with English machine translation) Logicites. Sep. 26, 2016. Retrieved from URL: http://www.logicites.fr/2016/09/26/a-quoi-ressemblera-dernier-Kilometre-10-ans/.
Rahman, M. T. A., Ahmad, S., Akmeliawati, R et al. Centre of gravity (C.O.G)-based analysis on the dynamics of the extendable double-link two-wheeled mobile robot. IOP Conference Series: Materials Science and Engineering, vol. 53, No. 1, 2013.
Ruan, X., Chen, J., Cai, J. et al. (2011). Research on stable control for two-wheeled self-balancing robot in complex environment. Beijing Gongye Daxue Xuebao (Journal of Beijing University ofTechnology), 37(9), 1310-1316. Retrieved from http:1/search.proquest.com/docview/963872724 ?accountid= 10920—Abstract Only.
Sales, J., Marti, J_ V., Mann, R et al. CompaRob: the shopping cart assistance robot. International Journal of Distributed Sensor Networks, 2016.
Van der Wijk, V., & Herder, J. L. Force balancing of variable payload by active force-balanced reconfiguration of the mechanism. In Reconfigurable Mechanisms and Robots, 2009. ReMAR 2009. ASME/IFToMM International Conference, IEEE, Jun. 2009.
Wang, Kun, et al. Enhanced active dynamic balancing of the planar robots using a three-rotating-bar balancer, Mvances in Mechanical Engineering, vol. 8, No. 4, pp. 1-10, 2016.
Wu, K., Li, W., Liu, C. et al. (2006). Dynamic control of two-wheeled mobile robot. Yuhang Xuebao I Journal of 13 Astronautics, 27(2), 272-275. Retrieved from http:1/search.proquest.com/docview/29224261?accountid=10920—Abstract Only.
YouTube video uploaded on Nov. 21, 2016, titled "TwinswHeel M6 1945 Nov. 18, 2016" downloaded from https:l/www.youtube.com/watch?v=e3laoGU56nY&feature=youtu.be on Jan. 19, 2017.
YouTube video uploaded on Sep. 15, 2016, titled "TwinswHeel Lyon Sep. 13, 2016 EN" downloaded from https:l/www.youtube.com/watch?v=ysYtN3Wm5Dw&feature=youtu.be on Jan. 19, 2017.
Zhao, Y., Woo, C., & Lee, J. (2015). Balancing control of mobile manipulator with sliding mode controller. International Conference on Control, Automation and Systems (ICCAS), 802-805.
European Office Action dated Jul. 16, 2020 issued in corresponding European Application No. 16790806.0.
International Search Report and Written Opinion dated Dec. 14, 2018 issued in corresponding International Application No. PCT/US18/55135.
International Search Report and Written Opinion dated Jan. 17, 2020 issued in corresponding International Application No. PCT/US2019/057472.
Italian Search Report dated Sep. 27, 2017 issued in corresponding Italian Application No. 201700007710, with English translation.
Goher, K. "A two-wheeled machine with a handling mechanism in two different directions"; Robot. Biomim, vol. 3, No. 17; Publication [online], 2016 [retrieved Nov. 26, 2018).Retrieved from the Internet: URL: https://jrobio.springeropen.com/track/pdf/10.1186/s40638-016-0049-8; entire document.

* cited by examiner single door: right swing in single door: left swing in single door: left swing out vestibule: right swing in vestibule: left swing in vestibule: right swing out vestibule: left swing out elevator

METHOD FOR DETERMINING SELF-DRIVING VEHICLE BEHAVIOR MODELS, A SELF-DRIVING VEHICLE, AND A METHOD OF NAVIGATING A SELF-DRIVING VEHICLE

CROSS REFERENCE TO RELATED APPLICATIONS

The present application claims priority under 35 USC 119(e) to U.S. Provisional Patent Application No. 62/665,183 filed May 1, 2019, the contents of which are incorporated by reference.

The present application may be related to U.S. patent application Ser. No. 15/296,884 filed Oct. 18, 2016, entitled VEHICLE HAVING STABILIZATION SYSTEM, and U.S. patent application Ser. No. 29/592,340 filed Jan. 30, 2017, entitled BELT, each of which is incorporated herein by reference.

FIELD OF INTEREST

The present inventive concepts relate to the field of vehicles, and more particularly, although not exclusively, to self-driving vehicles suitable as personal-use vehicles.

SUMMARY

In accordance with one aspect of the inventive concepts, provided is a method of modeling behavior for use by a self-driving vehicle. The self-driving vehicle may take the form of a personal use or companion vehicle that cooperatively engages with at least one human user. As a companion vehicle, the self-driving vehicle may take the form of a "follower" vehicle, which can be a self-driving vehicle structured and arranged to cooperatively operate with a human user by implementing one or more behavior models in response to sensed conditions from the environment, stored data, and/or actions of the human user.

Generally, the follower vehicle is responsive to the leader and its actions. As a follower vehicle, the leader can be a human in some embodiments, but in other embodiments the leader could be another vehicle. The follower vehicle need not always physically lag behind a leader, but it may a predominate amount of time. In some embodiments, the follower vehicle may precede a leader in a specific instance in accordance with an applicable behavior model, for example when encountering a specific structural element accounted for in a behavior model.

The behavior models may take the form a set of stored computer instructions executable by at least one processor configured to control aspects of the self-driving follower vehicle. That is, executing the behavior model may control the drive, acceleration, deceleration, turning, pausing and/or stopping equipment and functions of the self-driving follower vehicle. Other functionality of the follower vehicle may be controlled by execution of the behavior model. Execution of the behavior models, therefore, improve the overall operation of the follower vehicle, e.g., making the follower vehicle more efficient, safe, responsive, and/or user-friendly, while also make the follower vehicle less of a distraction and obstacle to a human users and others.

In various embodiments, the method includes monitoring, tracking, and measuring leader interactions and actions with at least one other entity to determine a behavioral model of appropriate and cooperative behavior of a follower vehicle, where the other entity can be at least one structural element, human, and/or other vehicle. The method can include electronically storing the behavioral model, and can also include executing the behavioral model to cause the self-driving vehicle to cooperatively navigate an environment as a follower vehicle.

In accordance with one aspect of the inventive concepts, provided is a method of modeling behavior for a self-driving vehicle. The method includes tracking and measuring leader-follower interactions and actions with at least one structural element of an environment, including leader behaviors and follower behaviors, representing the leader behaviors and the follower behaviors in a behavior model, and electronically storing the behavioral model. The behavioral model is executable by the self-driving vehicle to cooperatively navigate the at least one structural element as a follower vehicle.

In various embodiments, the method includes establishing a measurable interaction environment model for the at least one structural element.

In various embodiments, the method includes tracking a person, a vehicle, and object movements with respect to the at least one structural element.

In various embodiments, the method includes providing an electronic format for describing stops, starts, pauses, movements, and behaviors of the self-driving vehicle/follower with respect to the at least one structural element and the leader.

In various embodiments, the method includes measuring and modeling the at least one structural element, follower vehicle, and/or human movement includes using one or more of film industry motion capture tools, stop action photography, filming and measuring vehicle and/or human movements, and/or motion sensors on vehicles and people.

In various embodiments, the at least one structural element comprises at least one right swing-in door.

In various embodiments, the at least one structural element comprises at least one left swing-in door.

In various embodiments, the at least one structural element comprises at least one right swing-out door.

In various embodiments, the at least one structural element comprises at least one left swing-out door.

In various embodiments, the at least one structural element comprises at least one sliding door.

In various embodiments, the at least one structural element comprises a plurality of right swing-in doors, a plurality of left swing-in doors, a plurality of right swing-out doors, a plurality of left swing-out doors, or a plurality of sliding doors.

In various embodiments, the vehicle is a mobile carrier comprising at least one storage compartment.

In various embodiments, the at least one structural element includes a door and the behavior model comprises: the vehicle following the leader, in response to the leader pausing at the door, the vehicle pausing and waiting for the door to open, in response to the door opening, the vehicle proceeding through the door and waiting for the leader, in response to the leader proceeding through the door, the vehicle resuming tracking of the leader, and the vehicle resuming following the leader.

In various embodiments, the vehicle proceeding through the door and waiting for the leader includes the vehicle moving aside and off a centerline of the door to wait for the leader.

In various embodiments, the at least one structural element includes a first door and a second door and the behavior model comprises: the vehicle following the leader, in response to the leader pausing at the first door, the vehicle pausing and waiting for the first door to open, in response to the first door opening, the vehicle proceeding through the first door and waiting for the leader, in response to the second door opening, the vehicle proceeding through the second door and waiting for the leader, in response to the leader proceeding through the second door, the vehicle resuming tracking of the leader, and the vehicle resuming following the leader.

In various embodiments, the vehicle proceeding through the first and/or the second door and waiting for the leader includes the vehicle moving aside and off a centerline of the first and/or second door to wait for the leader.

In various embodiments, the at least one structural element includes an elevator and the behavior model comprises the vehicle following the leader, in response to the leader pausing at an elevator door, the vehicle pausing and waiting for the door to open, in response to the door opening, the vehicle proceeding through the door moving to the back of the elevator, in response to the leader proceeding through the door into the elevator, the vehicle resuming tracking of the leader, and the vehicle resuming following the leader out of the elevator.

In accordance with another aspect of the inventive concepts, provided is a follower vehicle. The follower vehicle includes a body, a drive system configured to navigate the body to follow a leader, a computer processor and computer storage device, a behavior model executable by the processor to cooperatively navigate at least one structural element with the leader.

In various embodiments, the at least one structural element comprises at least one right swing-in door.

In various embodiments, the at least one structural element comprises at least one left swing-in door.

In various embodiments, the at least one structural element comprises at least one right swing-out door.

In various embodiments, the at least one structural element comprises at least one left swing-out door.

In various embodiments, the at least one structural element comprises at least one sliding door.

In various embodiments, the at least one structural element comprises: a plurality of right swing-in doors, a plurality of left swing-in doors, a plurality of right swing-out doors, a plurality of left swing-out doors, or a plurality of sliding doors.

In various embodiments, the vehicle is a mobile carrier comprising at least one storage compartment.

In various embodiments, the at least one structural element includes a door and the behavior model is executable to cause the vehicle to follow the leader, detect the leader paused at the door and in response pause and wait for the door to open, in response to the open door, proceed through the door and wait for the leader, in response to the leader proceeding through the door, resume tracking the leader, and resume following the leader.

In various embodiments, the behavior model is executable by the processor to cause the vehicle to move aside and off a centerline of the door to wait for the leader.

In various embodiments, the at least one structural element includes a first door and a second door and the behavior model is executable to cause the vehicle to: follow the leader, detect the leader paused at the first door and in response pause and wait for the first door to open, in response to the first door opening, proceed through the first door and wait for the leader, in response to the second door opening, proceed through the second door and wait for the leader, in response to the leader proceeding through the second door, resume tracking the leader, and resume following the leader.

In various embodiments, the behavior model is executable by the processor to cause the vehicle to move aside and off a centerline of the first and/or second door to wait for the leader.

In various embodiments, the at least one structural element includes an elevator and the behavior model is executable to cause the vehicle to: follow the leader, detect the leader paused at the first door and in response pause and wait for the first door to open, in response to the door opening, proceed through the door and move to the back of the elevator, in response to the leader proceeding through the door into the elevator, resume tracking the leader, and resume following the leader out of the elevator.

In accordance with another aspect of the inventive concept, provided is a method of navigating a follower vehicle through at least one structural element. The method includes using at least one processor, executing a behavior model to cause the vehicle to navigate the at least one structural element with the leader. The behavior model embodies leader behaviors and follower behaviors defining actions of the follower vehicle in response to actions of the leader related to the at least one structural element.

In various embodiments, the at least one structural element includes a door and navigating the follower vehicle by executing the behavior model comprises: the vehicle following the leader, in response to the leader pausing at the door, the vehicle pausing and waiting for the door to open, in response to the door opening, the vehicle proceeding through the door and waiting for the leader, in response to the leader proceeding through the door, the vehicle resuming tracking of the leader, and the vehicle resuming following the leader.

In various embodiments, the vehicle proceeding through the door and waiting for the leader includes the vehicle moving aside and off a centerline of the door to wait for the leader.

In various embodiments, the at least one structural element includes a first door and a second door and navigating the follower vehicle by executing the behavior model comprises: the vehicle following the leader, in response to the leader pausing at the first door, the vehicle pausing and waiting for the first door to open, in response to the first door opening, the vehicle proceeding through the first door and waiting for the leader, in response to the second door opening, the vehicle proceeding through the second door and waiting for the leader, in response to the leader proceeding through the second door, the vehicle resuming tracking of the leader, and the vehicle resuming following the leader.

In various embodiments, the vehicle proceeding through the first and/or the second door and waiting for the leader includes the vehicle moving aside and off a centerline of the first and/or second door to wait for the leader.

In various embodiments, the at least one structural element includes an elevator and navigating the follower vehicle by executing the behavior model comprises: the vehicle following the leader, in response to the leader pausing at an elevator door, the vehicle pausing and waiting for the door to open, in response to the door opening, the vehicle proceeding through the door moving to the back of the elevator, in response to the leader proceeding through the door into the elevator, the vehicle resuming tracking of the leader, and the vehicle resuming following the leader out of the elevator.

In accordance with another aspect of the inventive concepts, provided is a method of generating a behavior model for navigating a follower vehicle through at least one structural element, as shown and described.

In accordance with another aspect of the inventive concepts, provided is a follower vehicle configured to use a behavior model to navigate through at least one structural element, as shown and described.

In accordance with another aspect of the inventive concepts, provided is a method of navigating a follower vehicle through at least one structural element using a behavior model, as shown and described.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DESCRIPTION OF PREFERRED EMBODIMENTS

Figure 1:
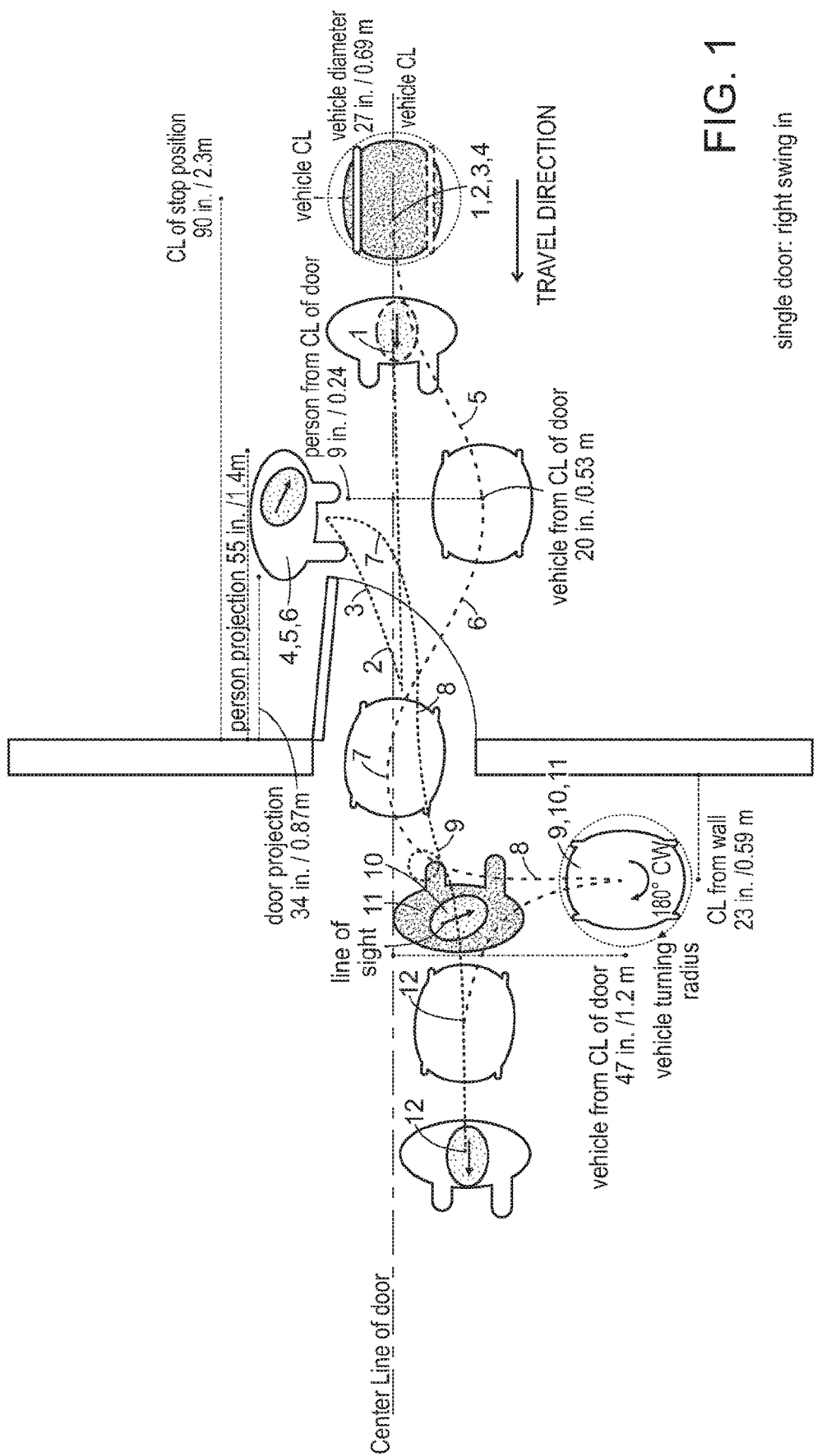
FIG. 1 is a flow diagram depicting an embodiment of a method of behavior-based navigation through a right swing-in doorway implemented by a self-driving vehicle, in accordance with aspects of the inventive concepts.

Various aspects of the inventive concepts will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

In accordance with one aspect of the inventive concepts, provided is a method of modeling behavior for use by a self-driving vehicle. The self-driving vehicle may take the form of a personal use or companion vehicle that cooperatively engages with at least one human user. As a companion vehicle, the self-driving vehicle may take the form of a "follower" vehicle, which can be a self-driving vehicle structured and arranged to cooperatively operate with a human user by implementing one or more behavior models in response to sensed conditions from the environment, stored data, and/or actions of the human user.

Generally, the follower vehicle is responsive to the leader and the leader's actions. As a follower vehicle, the leader can be a human in some embodiments, but in other embodiments the leader could be another vehicle. The follower vehicle need not always physically lag behind a leader, but it may in a predominate amount of operation. In some embodiments, the follower vehicle may precede a leader in a specific instance in accordance with an applicable behavior model, for example when encountering a specific structural element accounted for in a behavior model.

The behavior models may take the form a set of stored computer instructions and/or code executable by at least one processor configured to control aspects of the self-driving follower vehicle. All or part of the computer instructions and/or code can be stored locally on the vehicle or remotely. Executing the behavior model may control the drive, acceleration, deceleration, turning, pausing and/or stopping equipment and functions of the self-driving follower vehicle. Other functionality of the follower vehicle may also be controlled by execution of the behavior model. Execution of the behavior models, therefore, improve the overall operation of the follower vehicle, e.g., making the follower vehicle more efficient, safe, responsive, and/or user-friendly, while also make the follower vehicle less of a distraction and obstacle to a human users and others.

As a follower vehicle, the self-driving vehicle can be configured to follow a leader, such as a human leader. In various embodiments, the follower vehicle may also be a mobile carrier vehicle (or "mobile carrier") configured as a companion to a human. In various embodiments, a mobile carrier vehicle is a vehicle that includes structural and functional elements that define at least one volume useful for carrying goods. In various embodiments, the one or more volume can be configured to receive functional systems or subsystems that can interface with power and/or control ports of the self-driving vehicle, for use by the leader and or the self-driving vehicle. However, a self-driving follower vehicle is not limited to mobile carriers, and could, for example, take other forms of personal use and/or companion vehicles.

As a follower vehicle, the mobile carrier is generally configured to follow a human leader. Although, as will be apparent from the various embodiments described herein, the follower vehicle can proceed the human in some instances, at least for a portion of a path taken by the human. Such instances can include, but may not be limited to, passage through various types of doorways, vestibules, passageways, and/or other structural elements, such as elevators. The follower vehicle does not mimic human behavior, but rather is responsive to human behavior and structural elements to implement a behavior that is different from, but cooperative with, the human's to safely and efficiently navigate an encountered structural element with the human leader.

The structural elements can form part of an environment, where the environment can be indoor, outdoor, a transition from indoor to outdoor, and/or a transition from outdoor to indoor. The environment can be or include a building or an outdoor area, as examples.

Traditional robotic vehicles are designed to either follow pre-defined routes designed as part of the infrastructure, or in the case of self-driving navigation, to follow the most efficient, or shortest, route for that segment of the activity. This requires any nearby pedestrians to cede the path to the vehicle and results in unnatural behaviors by the pedestrians. Such traditional robotic vehicles are not follower vehicles, so have no particular necessity to exhibit behaviors that are cooperative with a human, as a companion to the human.

In various embodiments, a self-driving companion vehicle, such as a follower vehicle, is configured to execute certain behaviors in cooperation with a human—where the follower vehicle is a companion to the human. In various embodiments, the follower vehicle behaviors are implemented as execution of a set of instructions based on one or more behavior models. The behavior models define follower vehicle stops, starts, pauses, and movements based on the structural element encountered and the human leader's stops, starts, pauses, and movements. As a result, the follower vehicle is configured to be responsive to the structural element encountered and the human leader's actions, such as stops, starts, pauses, and movements, to navigate the structural element in cooperation with the human leader. Therefore, preferably, the follower vehicle is configured to recognize the structural element, as well as the human's actions.

The behavioral models can be obtained and developed in a variety of manners. In some embodiments, a system and method are provided that monitor and track pedestrian motions, movements, and activities during specific environment interactions, along with motions and movements performed by trained followers, to determine the appropriate stops, starts, routes, paths, and movements to be taken by a follower vehicle to make the interaction between a pedestrian/human leader and a follower vehicle effective with minimal or no obstruction to the leader and others. The interactions of the human leaders and followers when encountering structural elements are recorded and represented in computer or electronic behavior models that can be represented in electronic instructions, such as computer program code executable by a processor of a self-driving companion vehicle, such as a follower vehicle.

To operate as a follower vehicle, the self-driving vehicle preferably acquires the leader, e.g., by sensing the presence of the leader. Acquiring the leader may include recognition of the leader by one or more of various sensing and/or input mechanisms, such as various types of biometric sensors and/or input devices. The behavior models implemented by the self-driving vehicle, as a follower vehicle, take into consideration that the self-driving vehicle is a follower, so must take certain actions to wait for (pause) and reacquire the leader.

In accordance with aspects of the inventive concepts, robotic self-driving vehicles are configured to maximize efficiency by implementing behavior models at least partially, if not completely, defining how the self-driving vehicle responds to structural elements and a human leader's stops, starts, pauses, and movements. For example, in one embodiment, a self-driving vehicle coming to a closed doorway would stop at the entrance to the doorway, wait for the door to open, and then proceed directly through the door, wait for the human leader, re-acquire the human leader, and then continue with the human leader to a destination.

There is no need in the prior art to determine what actions a self-driving companion vehicle would take to pass and "re-acquire" a human leader. The present invention makes for a "seamless" and natural interaction between the self-driving vehicle and a human leader, particularly when navigating various structural elements of an environment. Modeling these behavioral interactions requires studying and considering leader-follower actions, not just analysis of path geometries, and then designing into the self-driving vehicle path segments. That alone would not provide a self-driving companion vehicle capable of more natural interaction with a leader encountering various types of structural elements.

In one embodiment, a method of determining and modeling desired follower vehicle behavior and movement includes:
- establishing a measurable interaction environment model for defined structural elements,
- providing at least one method to track a person, a vehicle, and object movements with respect to structural elements, and
- providing an electronic format for describing movements, pauses, and behaviors with respect to the structural elements and leader.

Measuring and modeling the structural elements and vehicles and/or human (e.g., leader) movement can include one or more of:
- using film industry motion capture tools,
- using stop action photography,
- filming and measuring vehicle and/or human movements, and/or
- using motion sensors on vehicles, structures, and/or people.

Data acquired from the above methods can be organized and stored in electronic form, and then processed into a self-driving companion vehicle behavior models, in an electronic format. The behavior model can comprise a set of rules implemented by a follower vehicle in combination with sensed inputs to cause the follower vehicle to function in new ways. A different behavior model can be defined for specific structures or situations encountered. Each behavior model can include a set of leader steps and a corresponding set of follower vehicle steps. In order to proceed from one step to the next, the follower vehicle preferably senses or otherwise determines that the leader has accomplished its step. The leader and the follower work through a series of steps until the two negotiate the encountered structural element. The various approaches to sensing and measuring discussed above, and the data obtained therefrom, is computer processed to generate the steps of the behavior models.

In various embodiments, a self-driving companion vehicle in accordance with aspects of the inventive concept can take the form of the GITA™ mobile-carrier vehicle by Piaggio Fast Forward of Boston, Mass. (GITA™ is a trademark of Piaggio Fast Forward of Boston, Mass.) Such a mobile carrier vehicle can be used to develop and use the behavior models described herein.

The follower vehicle can include a body, drive system, at least one processor, at least one memory, and at least one sensor that cooperatively enable the follower vehicle to sense and follow a leader, e.g., a human leader. The at least one sensor can also be configured to sense structural elements, such as doors, walls and other objects in an environment. The processor can control the drive system to cause the follower vehicle to stop, accelerate, decelerate, pause, start, and turn as it follows and interacts with a leader. The processor can control behavior of the follower vehicle based, at least in part, on one or more the behavior models, e.g., comprising a plurality of stored rules, and sensor inputs. The body can define at least one volume, cavity or compartment configured to store a variety of types of items. The compartment can include one or more of thermal, vibration, and shock insulation. The compartment can be air and/or water tight, in some embodiments.

FIGS. 1 through 9 depict various embodiments of a self-driving companion vehicle, e.g., as a follower vehicle, implementing methods of interaction with a leader and different structural elements, the methods configured to control follower vehicle's stops, starts, pauses, and movements according to one or more behavior models.

It will be understood by those skilled in the art that the specific distance measurements and movements of the human, e.g., "1.2 m", "turns 90°", "Pulls on door handle with right hand", and so on, are not essential human movements, but rather modeled human behaviors useful for determining behavioral models to be implemented by the follower vehicle. That is, variations in specific details of the human behavior are permissible without altering the basic functionality of the follower vehicle. The specific distances and movements of the human are representative of more general human behavior.

FIG. 1 is a flow diagram depicting an embodiment of a method of behavior-based navigation through a right swing-in doorway implemented by a self-driving companion follower vehicle, in accordance with aspects of the inventive concepts. In FIG. 1, travel is from right to left, as indicated by the Travel Direction arrow. The behavior model of FIG. 1 demonstrates a multistep interaction between the follower vehicle and a human leader (Person), where the follower vehicle waits for a door to be opened, passes through an open door, waits for the leader to pass through the open door, and then resumes following the human (leader). For purposes of explanation, an imaginary centerline (CL) is shown passing though the doorway, where the centerline is perpendicular to the door in a closed position.

Table 1 below represents the behavioral model implemented by the follower vehicle, and includes follower vehicle stops, starts, pauses and movements in relation to modeled human leader stops, starts, pauses and movements in view of the encountered structural element. Therefore, Table 1 shows the series of steps taken by the follower vehicle in response to its interpretation of human behavior and environmental structural elements, which can be sensed by the one or more sensors. In this embodiment, the structural element is a right swing-in door. In Table 1, the Person approaches the door, in step 1, and the follower vehicle approaches following the Person, in step 1, and eventually stops at distance away from the door. Table 1 goes on to outline steps taken by the human and then responsive steps taken by the follower vehicle, until the human and follower vehicle are both through the door and the follower vehicle has resumed following the human leader. Responsive steps taken by the follower vehicle can be embodied within logic executed by the follower vehicle, such as within program code or other computer instructions.

TABLE 1

Right Swing-in Door

| Follower Vehicle | Person |
|---|---|
| 1. Approaches door in follow state | 1. Approaches door |
| 2. Stops 2.8 m away from door | 2. Stops at arm's length of door handle |
| 3. Waits | 3. Pulls on door handle with right hand to open door to the right and moves back |
| 4. Waits | 4. Stops slightly behind fully open door, feet project about 0.24 m from CL of door. |
| 5. Initiates door behavior. Moves to the left 0.53 m from CL of door to give person space | 5. Holds door open for follower vehicle to pass through |
| 6. Moves right, back to CL of door to align itself with door opening | 6. Waits |
| 7. Passes through door and turns left | 7. Swings around door, holding onto handle |
| 8. Moves along wall, about 0.59 m away from wall | 8. Makes a 180° turn clockwise to face door, continues moving backward |
| 9. Stops about 1.2 m away from CL of door and makes a 180° clockwise turn | 9. Closes door shut |
| 10. Waits | 10. Turns 90° clockwise to face follower vehicle |
| 11. Resumes tracking | 11. Turns 90° clockwise to face path forward |
| 12. Resumes following | 12. Continues walking straight |

Figure 2:
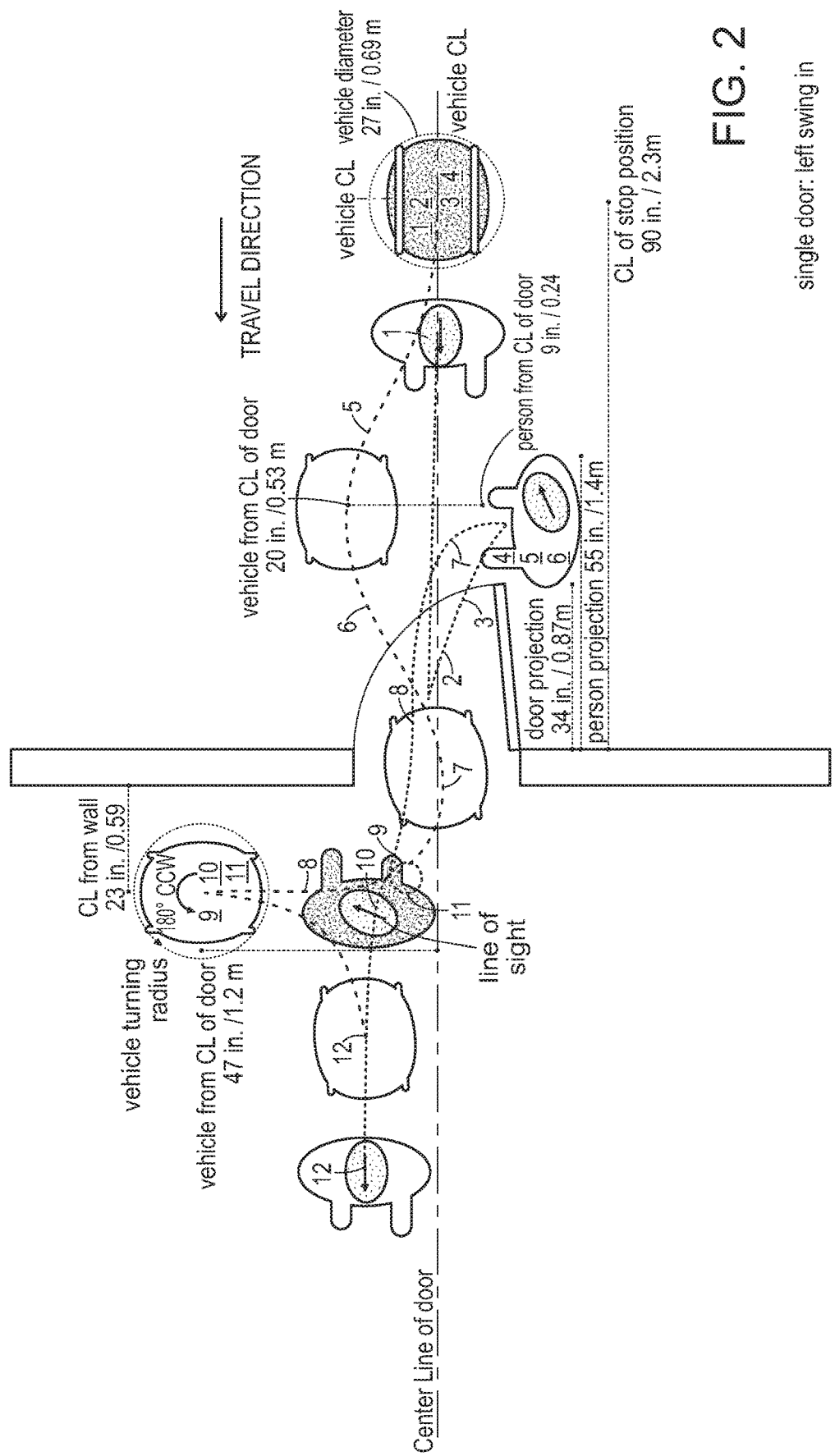
FIG. 2 is a flow diagram depicting an embodiment of a method of behavior-based navigation through a left swing-in doorway implemented by a self-driving companion vehicle, in accordance with aspects of the inventive concepts.

FIG. 2 is a flow diagram depicting an embodiment of a method of behavior-based navigation through a left swing-in doorway implemented by a self-driving companion follower vehicle, in accordance with aspects of the inventive concepts. In FIG. 2, travel is from right to left, again indicated by the Travel Direction arrow. The behavior model of FIG. 2 demonstrates a multistep interaction between the follower vehicle and the human leader (Person), where the follower vehicle waits for a door to be opened, passes through an open door, waits for the leader to pass through the open door, and then resumes following the human (leader). For purposes of explanation, the imaginary centerline (CL) is shown passing though the doorway, where the centerline is perpendicular to the door in a closed position.

Table 2 below represents the behavioral model implemented by the follower vehicle, and includes follower vehicle stops, starts, pauses and movements in relation to modeled human leader stops, starts, pauses and movements in view of the encountered structural element. Therefore, Table 2 shows the series of steps taken by the follower vehicle in response to its interpretation of human behavior and environmental structural elements, which can be sensed by the one or more sensors. In this embodiment, the structural element is a left swing-in door. In Table 2, the Person approaches the door, in step 1, and the follower vehicle approaches following the Person, in step 1, and eventually stops at distance away from the door. Table 2 goes on to outline steps taken by the human and then responsive steps taken by the follower vehicle, until the human and follower vehicle are both through the door and the follower vehicle has resumed following the human leader. Responsive steps taken by the follower vehicle can embodied within logic executed by the follower vehicle, such as within program code or other computer instructions.

TABLE 2

Left Swing-in Door

| Follower Vehicle | Person |
|---|---|
| 1. Stops 2.3 m away from door | 1. Approaches door |
| 2. Waits | 2. Stops at arm's length of door handle |
| 3. Waits | 3. Pulls on door handle with left hand to open door to the left and moves back |
| 4. Waits | 4. Stops slightly behind fully open door, feet project about 0.24 m from CL of door. |
| 5. Initiates door behavior. Moves to the right 0.53 m from CL of door to give person space | 5. Holds door open for follower vehicle to pass through |
| 6. Moves left, back to CL of door to align itself with door opening | 6. Waits |
| 7. Passes through door and turns right | 7. Swings around door, holding onto handle |
| 8. Moves along wall, about 0.59 m away from wall | 8. Makes a 180° turn counter-clockwise to face door, continues moving backward |
| 9. Stops about 1.2 m away from CL of door and makes a 180° counter-clockwise turn | 9. Closes door shut |
| 10. Waits | 10. Turns 90° counter-clockwise to face follower vehicle |
| 11. Resumes tracking | 11. Turns 90° counter-clockwise to face path forward |
| 12. Resumes following | 12. Continues walking straight |

Figure 3:
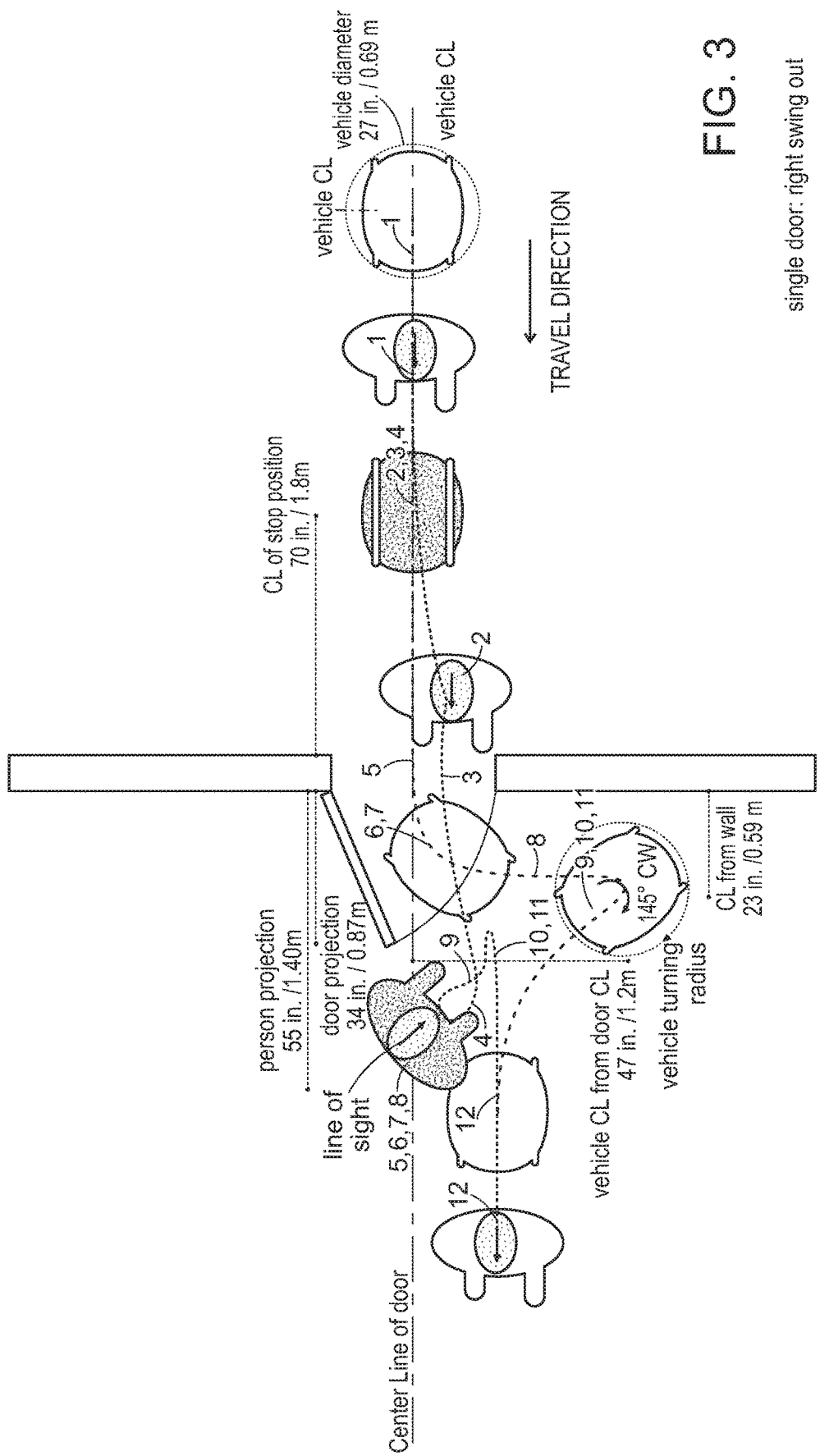
FIG. 3 is a flow diagram depicting an embodiment of a method of behavior-based navigation through a right swing-out doorway implemented by a self-driving companion vehicle, in accordance with aspects of the inventive concepts.

FIG. 3 is a flow diagram depicting an embodiment of a method of behavior-based navigation through a right swing-out doorway implemented by a self-driving companion follower vehicle, in accordance with aspects of the inventive concepts. In FIG. 3, travel is from right to left, as indicated by the Travel Direction arrow. The behavior model of FIG. 3 demonstrates a multistep interaction between the follower vehicle and a human leader (Person), where the follower vehicle waits for a door to be opened, passes through an open door, waits for the leader to pass through the open door, and then resumes following the human (leader). For purposes of explanation, the imaginary centerline (CL) is shown passing though the doorway, where the centerline is perpendicular to the door in a closed position.

Table 3 below represents the behavioral model implemented by the follower vehicle, and includes follower vehicle stops, starts, pauses and movements in relation to modeled human leader stops, starts, pauses and movements in view of the encountered structural element. Therefore, Table 3 shows the series of steps taken by the follower vehicle in response to its interpretation of human behavior and environmental structural elements, which can be sensed by the one or more sensors. In this embodiment, the structural element is a right swing-out door. In Table 3, the Person approaches the door, in step 1, and the follower vehicle approaches following the Person, in step 1, and eventually stops at distance away from the door. Table 3 goes on to outline steps taken by the human and then responsive steps taken by the follower vehicle, until the human and follower vehicle are both through the door and the follower vehicle has resumed following the human leader. Responsive steps taken by the follower vehicle can embodied within logic executed by the follower vehicle, such as within program code or other computer instructions.

Figure 4:
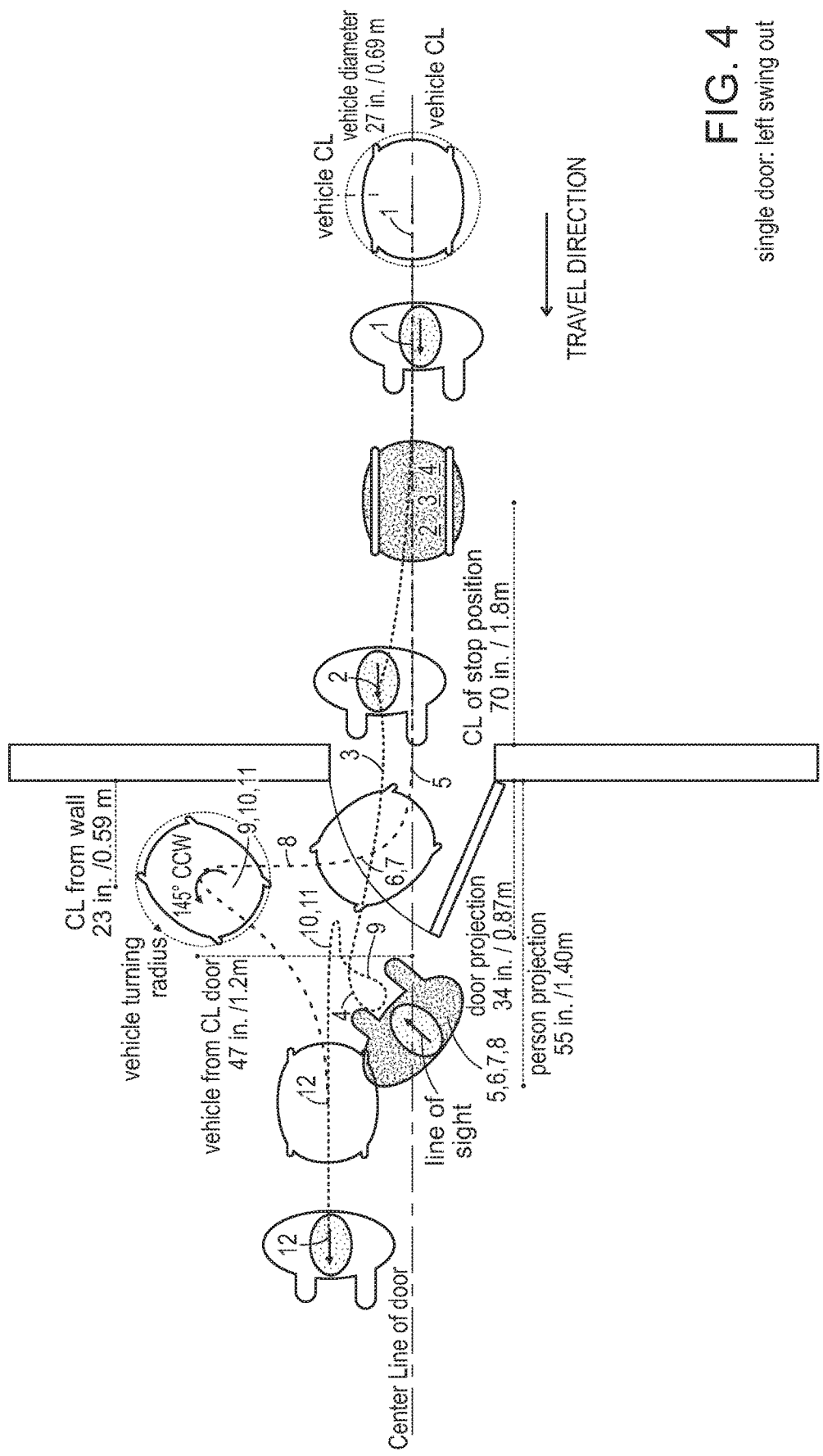
FIG. 4 is a flow diagram depicting an embodiment of a method of behavior-based navigation through a left swing-out doorway implemented by a self-driving companion vehicle, in accordance with aspects of the inventive concepts.

FIG. 4 is a flow diagram depicting an embodiment of a method of behavior-based navigation through a left swing-out doorway implemented by a self-driving companion follower vehicle, in accordance with aspects of the inventive concepts. In FIG. 4, travel is from right to left, as indicated by the Travel Direction arrow. The behavior model of FIG. 4 demonstrates a multistep interaction between the follower vehicle and a human leader (Person), where the follower vehicle waits for a door to be opened, passes through an open door, waits for the leader to pass through the open door, and then resumes following the human (leader). For purposes of explanation, the imaginary centerline (CL) is shown passing though the doorway, where the centerline is perpendicular to the door in a closed position.

Table 4 below represents the behavioral model implemented by the follower vehicle, and includes follower vehicle stops, starts, pauses and movements in relation to modeled human leader stops, starts, pauses and movements in view of the encountered structural element. Therefore, Table 4 shows the series of steps taken by the follower vehicle in response to its interpretation of human behavior and environmental structural elements, which can be sensed by the one or more sensors. In this embodiment, the structural element is a left swing-out door. In Table 4, the Person approaches the door, in step 1, and the follower vehicle approaches following the Person, in step 1, and eventually stops at distance away from the door. Table 4 goes on to outline steps taken by the human and then responsive steps taken by the follower vehicle, until the human and follower vehicle are both through the door and the follower vehicle has resumed following the human leader. Responsive steps taken by the follower vehicle can embodied within logic executed by the follower vehicle, such as within program code or other computer instructions.

TABLE 3

Right Swing-out Door

| Follower Vehicle | Person |
|---|---|
| 1. Approaches door in follow state | 1. Approaches door |
| 2. Stops 2.3 m away from door | 2. Stops at arm's length of door handle |
| 3. Waits | 3. Grabs door handle with right hand and pushes to open door to the right. |
| 4. Initiates door behavior | 4. Opens door to about an 80° swing and makes a clockwise loop to stand slightly behind door. |
| 5. Moves towards CL of door | 5. Holds door open for follower vehicle to pass through |
| 6. Proceeds through door opening | 6. Waits |
| 7. Turns left immediately after passing through door | 7. Waits |
| 8. Moves along wall, about 0.59 m away from wall | 8. Waits |
| 9. Stops about 1.2 m away from CL of door and makes a 145° clockwise turn | 9. Grabs door handle with left hand and moves forward to push door closed |
| 10. Waits | 10. Turns 90° clockwise to face follower vehicle |
| 11. Resumes tracking | 11. Turns 90° clockwise to face path forward |
| 12. Resumes following | 12. Continues walking straight |

TABLE 4

Left Swing-out Door

| Follower Vehicle | Person |
|---|---|
| 1. Centers itself with door and stops 1.8 m away from door | 1. Approaches door |
| 2. Waits | 2. Stops at arm's length of door handle |
| 3. Waits | 3. Grabs door handle with left hand and pushes to open door to the left |
| 4. Initiates door behavior | 4. Opens door to about an 80° swing and makes a counter-clockwise loop to stand slightly behind door. |
| 5. Moves towards CL of door | 5. Holds door open for follower vehicle to pass through |
| 6. Proceeds through door opening | 6. Waits |
| 7. Turns right immediately after passing through door | 7. Waits |
| 8. Moves along wall, about 0.59 m away from wall | 8. Waits |
| 9. Stops about 1.2 m away from CL of door and makes a 145° counter-clockwise turn | 9. Grabs door handle with right hand and moves forward to push door closed |
| 10. Waits | 10. Turns 90° counter-clockwise to face follower vehicle |
| 11. Resumes tracking | 11. Turns 90° counter-clockwise to face path forward |
| 12. Resumes following | 12. Continues walking straight |

Figure 5:
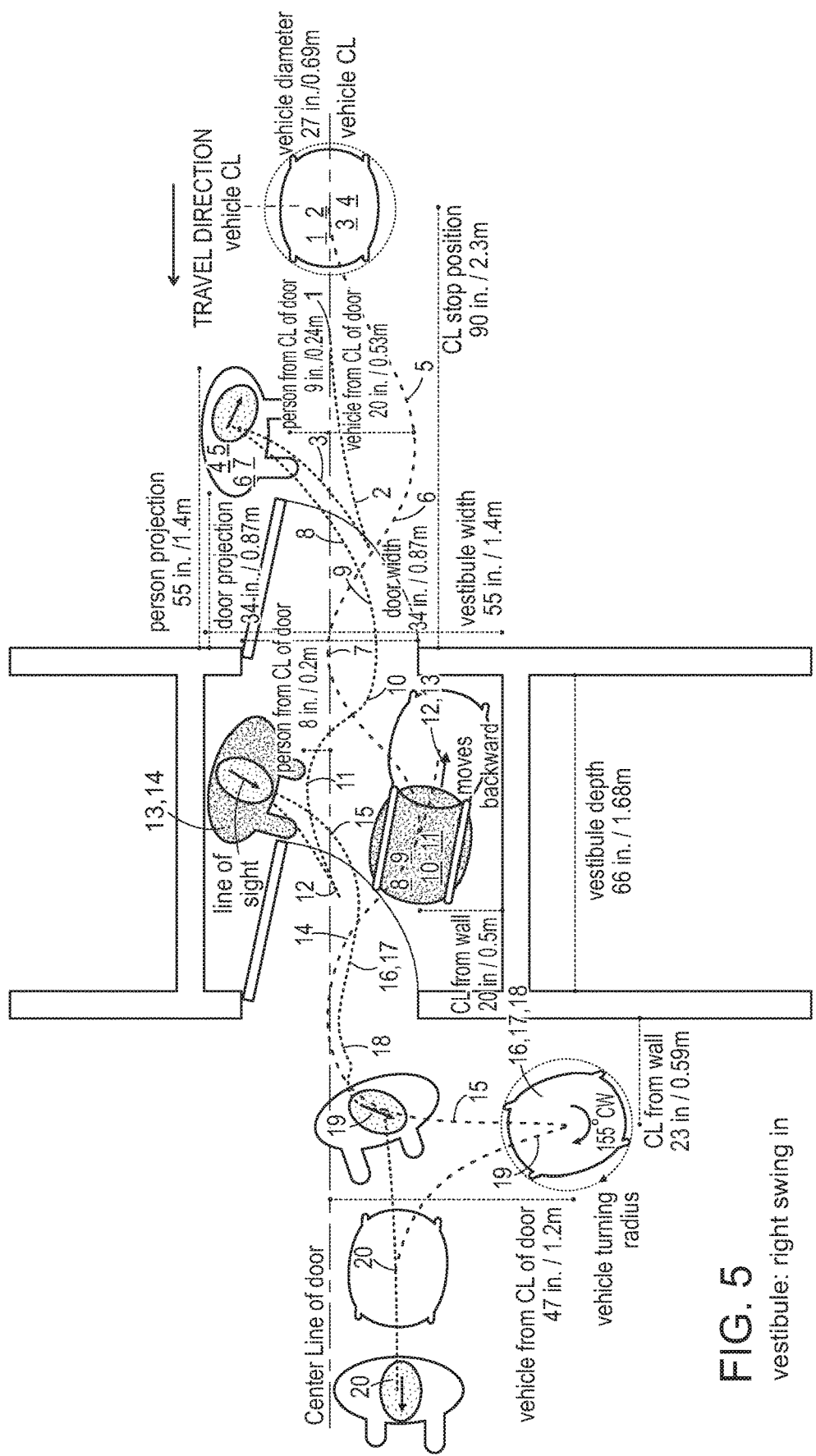
FIG. 5 is a flow diagram depicting an embodiment of a method of behavior-based navigation through a vestibule, right swing-in doorway implemented by a self-driving companion vehicle, in accordance with aspects of the inventive concepts.

FIG. 5 is a flow diagram depicting an embodiment of a method of behavior-based navigation through a vestibule, right swing-in doorway implemented by a self-driving companion vehicle, in accordance with aspects of the inventive concepts. In FIG. 5, travel is from right to left and the vestibule includes two right swing-in doors, as indicated by the Travel Direction arrow. The behavior model of FIG. 5 demonstrates a multistep interaction between the follower vehicle and a human leader (Person), where the follower vehicle waits for a first door to be opened, passes through the first open door, waits for the leader to pass through the first open door, passes through a second open door, waits for the leader to pass through the second open door, and then resumes following the human (leader). For purposes of explanation, the imaginary centerline (CL) is shown passing though the doorway, where the centerline is perpendicular to the door in a closed position.

Table 5 below represents the behavioral model implemented by the follower vehicle, and includes follower vehicle stops, starts, pauses and movements in relation to modeled human leader stops, starts, pauses and movements in view of the encountered structural element. Therefore, Table 5 shows the series of steps taken by the follower vehicle in response to its interpretation of human behavior and environmental structural elements, which can be sensed by the one or more sensors. In this embodiment, the structural element is a vestibule having a plurality of right swing-in doors. In Table 5, the Person approaches the first door, in step 1, and the follower vehicle approaches following the Person, in step 1, and eventually stops at distance away from the door. Table 5 goes on to outline steps taken by the human and then responsive steps taken by the follower vehicle, until the human and follower vehicle are both through the vestibule and the follower vehicle has resumed following the human leader. Responsive steps taken by the follower vehicle can embodied within logic executed by the follower vehicle, such as within program code or other computer instructions.

TABLE 5

Vestibule, Right Swing-in Doors

| Follower Vehicle | Person |
|---|---|
| 1. Approaches door in follow state | 1. Approaches door |
| 2. Stops 2.3 m away from door | 2. Stops at arm's length of door handle |
| 3. Waits | 3. Pulls on door handle with right hand to open door to the right and moves back |
| 4. Initiates vestibule behavior | 4. Stops slightly behind fully open door, feet project about 0.24 m from CL of door. |
| 5. Moves to the left 0.53 m from CL of door to give person space | 5. Holds door open for follower vehicle to pass through |
| 6. Moves right, to align with CL of door opening | 6. Waits |
| 7. Passes through door and veers to the left | 7. Waits |
| 8. At 0.5 m away from wall, veers to the right to align its line of site with second door and stops | 8. Swings around door, holding onto handle |
| 9. Waits | 9. Makes a 180° turn clockwise to face door, continues moving backward |
| 10. Waits | 10. Closes door shut |
| 11. Waits | 11. Makes along 180° counter-clockwise turn along the right side of follower vehicle |

TABLE 5-continued

Vestibule, Right Swing-in Doors

| Follower Vehicle | Person |
| --- | --- |
| 12. Moves 0.5 m backwards to give user some space | 12. Stops at arm's length and pulls on door handle with right hand to open door to the right and moves back |
| 13. Waits | 13. Stops slightly behind fully open door, feet project about 0.24 m from CL of door |
| 14. Moves forward towards center of door and aligns itself to pass through | 14. Holds door open for follower vehicle to pass through |
| 15. Turns left and moves along wall, about 0.59 m away from wall | 15. Swings around door, holding onto handle |
| 16. Stops about 1.17 m away from CL of door and makes a 155° clockwise turn | 16. Makes a 180° turn clockwise to face door, continues moving backward |
| 17. Waits | 17. Closes door shut |
| 18. Waits | 18. Turns 90° clockwise to face follower vehicle |
| 19. Resumes tracking | 19. Turns 90° clockwise to face path forward |
| 20. Continues following | 20. Continues walking straight |

Figure 6:
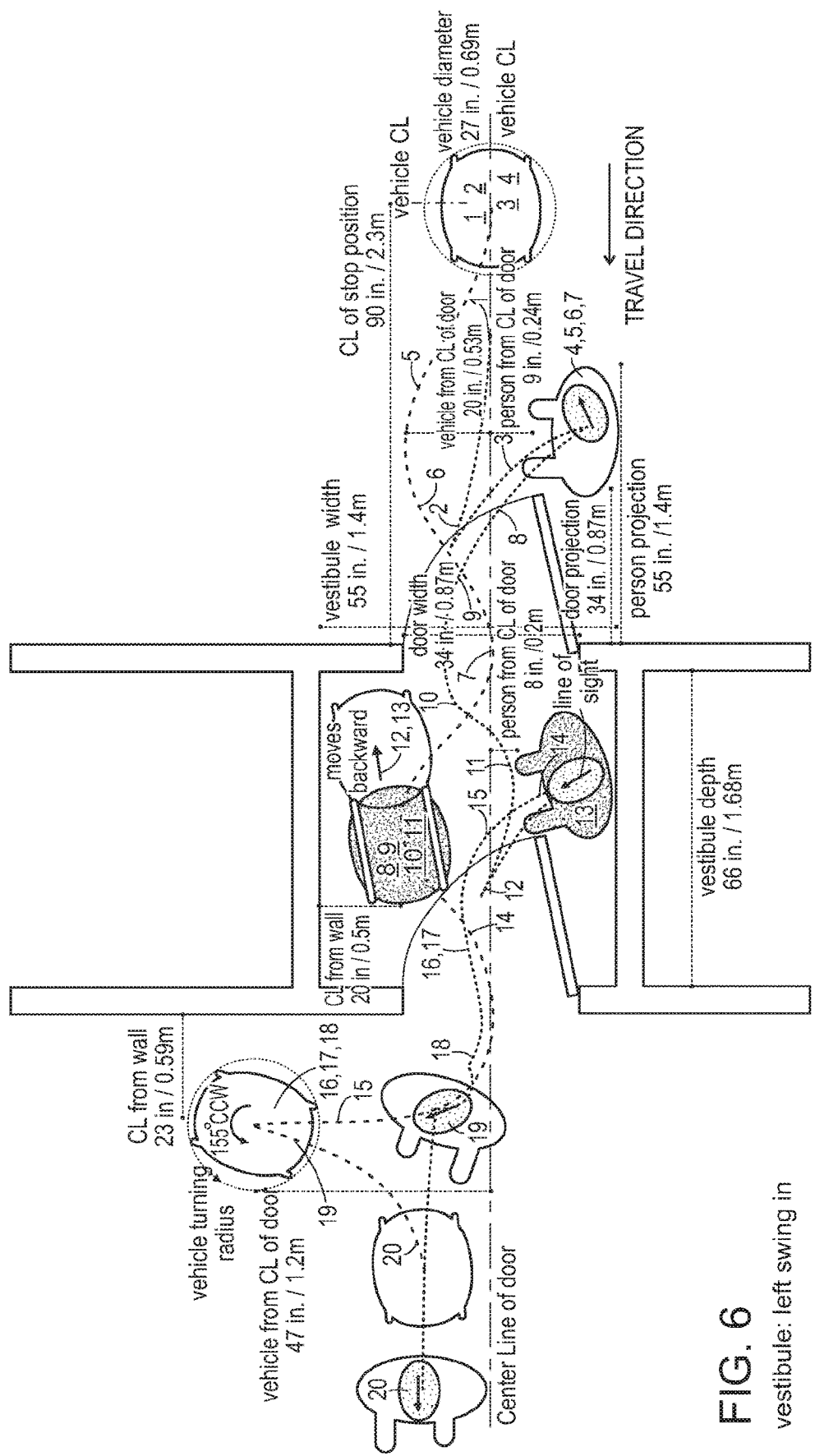
FIG. 6 is a flow diagram depicting an embodiment of a method of behavior-based navigation through a vestibule, left swing-in doorway implemented by a self-driving companion vehicle, in accordance with aspects of the inventive concepts.

FIG. 6 is a flow diagram depicting an embodiment of a method of behavior-based navigation through a vestibule, left swing-in doorway implemented by a self-driving companion vehicle, in accordance with aspects of the inventive concepts. In FIG. 6, travel is from right to left and the vestibule includes two left swing-in doors, as indicated by the Travel Direction arrow. The behavior model of FIG. 6 demonstrates a multistep interaction between the follower vehicle and a human leader (Person), where the follower vehicle waits for a first door to be opened, passes through the first open door, waits for the leader to pass through the first open door, passes through a second open door, waits for the leader to pass through the second open door, and then resumes following the human (leader). For purposes of explanation, the imaginary centerline (CL) is shown passing though the doorway, where the centerline is perpendicular to the door in a closed position.

Table 6 below represents the behavioral model implemented by the follower vehicle, and includes follower vehicle stops, starts, pauses and movements in relation to modeled human leader stops, starts, pauses and movements in view of the encountered structural element. Therefore, Table 6 shows the series of steps taken by the follower vehicle in response to its interpretation of human behavior and environmental structural elements, which can be sensed by the one or more sensors. In this embodiment, the structural element is a vestibule having a plurality of left swing-in doors. In Table 6, the Person approaches the first door, in step 1, and the follower vehicle approaches following the Person, in step 1, and eventually stops at distance away from the door. Table 6 goes on to outline steps taken by the human and then responsive steps taken by the follower vehicle, until the human and follower vehicle are both through the vestibule and the follower vehicle has resumed following the human leader. Responsive steps taken by the follower vehicle can embodied within logic executed by the follower vehicle, such as within program code or other computer instructions.

TABLE 6

Vestibule, Left Swing-in Doors

| Follower Vehicle | Person |
| --- | --- |
| 1. Approaches door in follow state | 1. Approaches door |
| 2. Stops 2.3 m away from door | 2. Stops at arm's length of door handle |
| 3. Waits | 3. Pulls on door handle with right hand to open door to the right and moves back |
| 4. Waits | 4. Stops slightly behind fully open door, feet project about 0.24 m from CL of door. |
| 5. Initiates vestibule behavior. Moves to the right 0.53 m from CL of door to give person space | 5. Holds door open for follower vehicle to pass through |
| 6. Moves left, to align with CL of door opening | 6. Waits |
| 7. Passes through door and veers to the right | 7. Waits |
| 8. At 0.59 m away from wall, veers to the left to align its line of site with second door and stops | 8. Swings around door, holding onto handle |
| 9. Waits | 9. Makes a 180° turn clockwise to face door, continues moving backward |
| 10. Waits | 10. Closes door shut |
| 11. Waits | 11. Makes a long 180° counter-clockwise turn along the right side of follower vehicle |
| 12. Moves 0.5 m backwards to give user some space | 12. Stops at arm's length and pulls on door handle with right hand to open door to the right and moves back |
| 13. Waits | 13. Stops slightly behind fully open door, feet project about 0.24 m from CL of door |

TABLE 6-continued

Vestibule, Left Swing-in Doors

| Follower Vehicle | Person |
| --- | --- |
| 14. Moves forward towards center of door and aligns itself to pass through | 14. Holds door open for follower vehicle to pass through |
| 15. Turns right and moves along wall, about 0.5 m away from wall | 15. Swings around door, holding onto handle |
| 16. Stops about 1.2 m away from CL of door and makes a 155° counter-clockwise turn | 16. Makes a 180° turn clockwise to face door, continues moving backward |
| 17. Waits | 17. Closes door shut |
| 18. Waits | 18. Turns 90° clockwise to face follower vehicle |
| 19. Resumes tracking | 19. Turns 90° clockwise to face path forward |
| 20. Continues following | 20. Continues walking straight |

Figure 7:
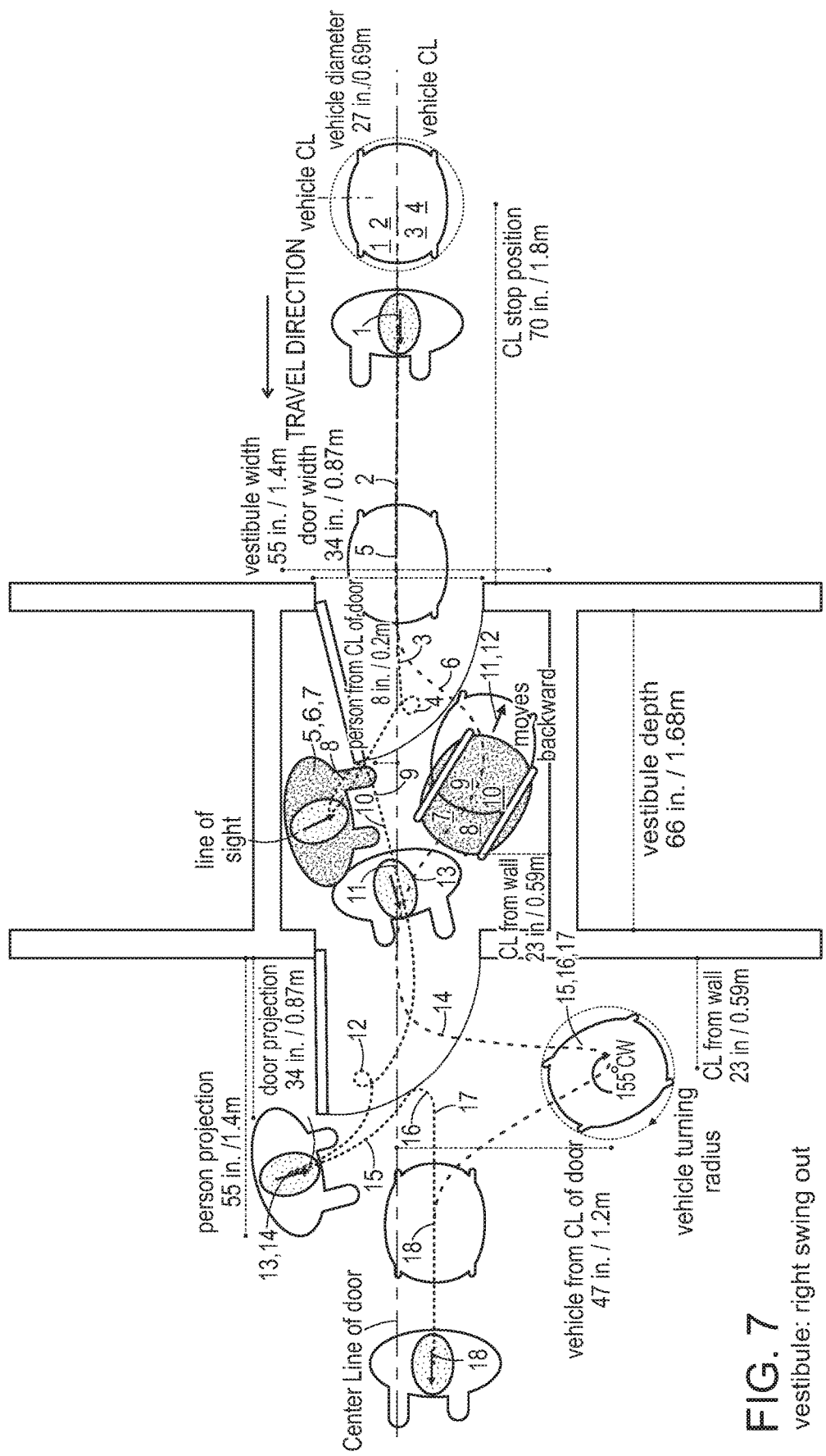
FIG. 7 is a flow diagram depicting an embodiment of a method of behavior-based navigation through a vestibule, right swing-out doorway implemented by a self-driving companion vehicle, in accordance with aspects of the inventive concepts.

FIG. 7 is a flow diagram depicting an embodiment of a method of behavior-based navigation through a vestibule, right swing-out doorway implemented by a self-driving companion vehicle, in accordance with aspects of the inventive concepts. In FIG. 7, travel is from right to left and the vestibule includes two right swing-out doors, as indicated by the Travel Direction arrow. The behavior model of FIG. 7 demonstrates a multistep interaction between the follower vehicle and a human leader (Person), where the follower vehicle waits for a first door to be opened, passes through the first open door, waits for the leader to pass through the first open door, passes through a second open door, waits for the leader to pass through the second open door, and then resumes following the human (leader). For purposes of explanation, the imaginary centerline (CL) is shown passing though the doorway, where the centerline is perpendicular to the door in a closed position.

Table 7 below represents the behavioral model implemented by the follower vehicle, and includes follower vehicle stops, starts, pauses and movements in relation to modeled human leader stops, starts, pauses and movements in view of the encountered structural element. Therefore, Table 7 shows the series of steps taken by the follower vehicle in response to its interpretation of human behavior and environmental structural elements, which can be sensed by the one or more sensors. In this embodiment, the structural element is a vestibule having a plurality of right swing-out doors. In Table 7, the Person approaches the first door, in step 1, and the follower vehicle approaches following the Person, in step 1, and eventually stops at distance away from the door. Table 7 goes on to outline steps taken by the human and then responsive steps taken by the follower vehicle, until the human and follower vehicle are both through the vestibule and the follower vehicle has resumed following the human leader. Responsive steps taken by the follower vehicle can embodied within logic executed by the follower vehicle, such as within program code or other computer instructions.

TABLE 7

Vestibule, Right Swing-out Doors

| Follower Vehicle | Person |
| --- | --- |
| 1. Approaches door in follow state | 1. Approaches door |
| 2. Stops 1.8 m away from door | 2. Stops at arm's length of door handle |
| 3. Waits | 3. Grabs door handle with right hand and pushes to open door to the right |
| 4. Initiates vestibule behavior | 4. Opens door to about an 80° swing and makes a counter-clockwise loop to stand slightly behind door. |
| 5. Moves diagonally to the right to align with CL of door | 5. Holds door open for follower vehicle to pass through |
| 6. Passes through door and veers to the left | 6. Waits |
| 7. At 0.59 m away from wall, veers to the right to align its line of site with second door and stops | 7. Waits |
| 8. Waits | 8. Grabs door handle with left hand and moves forward to push door closed |
| 9. Waits | 9. Makes a 45° clockwise turn to face follower vehicle |
| 10. Waits | 10. Turns to face the door and moves forward to reach for the door handle |
| 11. Moves 0.5 m backwards to give user some space | 11. Grabs door handle with right hand, pushes door open and walks through |
| 12. Waits | 12. Opens door fully and makes a clockwise loop to stand slightly behind it |
| 13. Moves forward towards center of door and aligns itself to pass through | 13. Holds door open for follower vehicle to pass through |
| 14. Turns left and moves along wall, about 0.59 m away from wall | 14. Waits |
| 15. Stops about 1.2 m away from CL of door and makes a 120° clockwise turn | 15. Grabs door handle with left hand and moves forward to push door closed |

TABLE 7-continued

| Vestibule, Right Swing-out Doors | |
| --- | --- |
| Follower Vehicle | Person |
| 16. Waits | 16. Turns 90° clockwise, looks at follower vehicle |
| 17. Resumes tracking | 17. Turns another 90° clockwise to face forward |
| 18. Continues following | 18. Continues walking straight |

Figure 8:
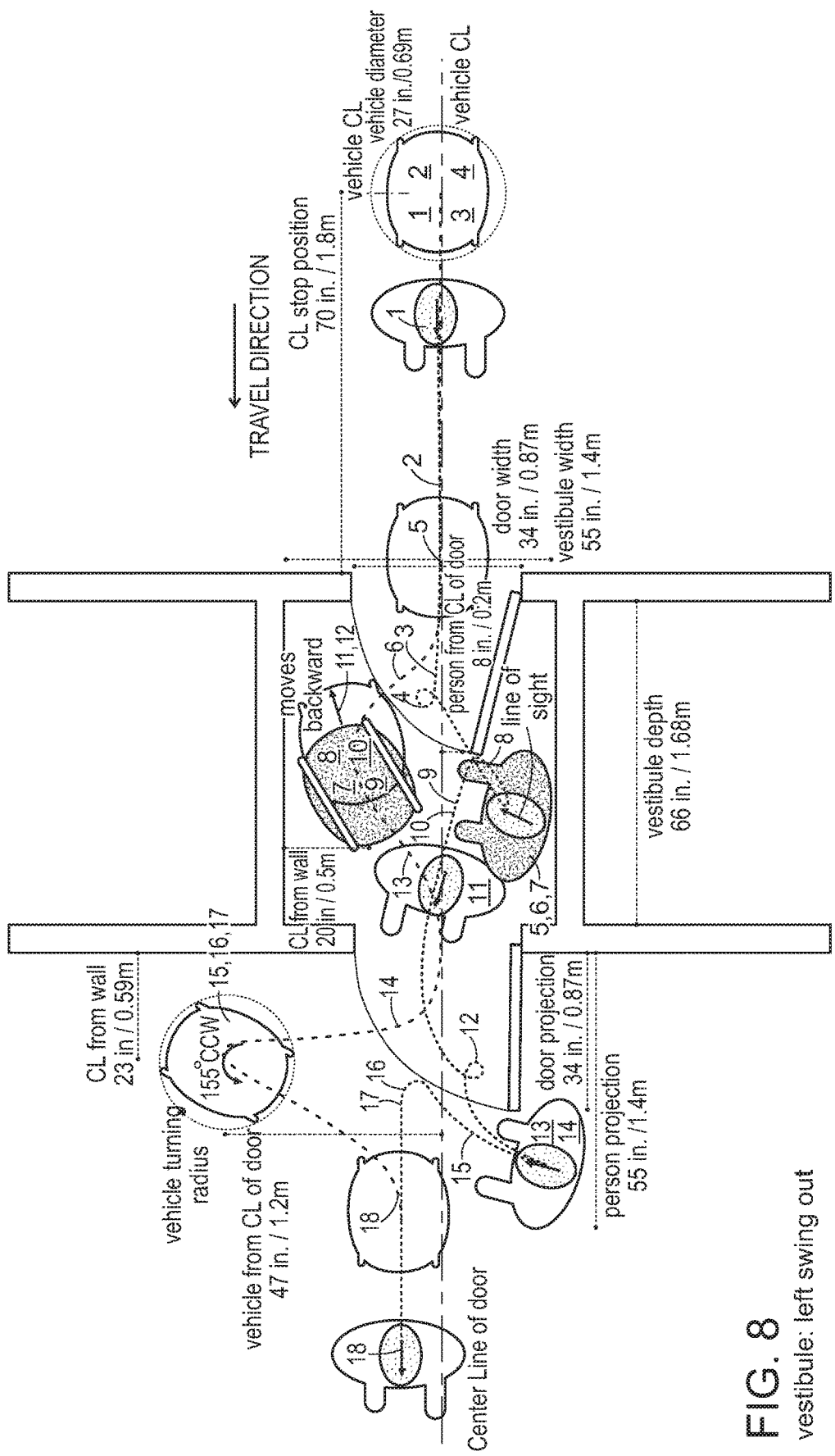
FIG. 8 is a flow diagram depicting an embodiment of a method of behavior-based navigation through a vestibule, left swing-out doorway implemented by a self-driving companion vehicle, in accordance with aspects of the inventive concepts.

FIG. 8 is a flow diagram depicting an embodiment of a method of behavior-based navigation through a vestibule, left swing-out doorway implemented by a self-driving companion vehicle, in accordance with aspects of the inventive concepts. In FIG. 8, travel is from right to left and the vestibule includes two left swing-out doors, as indicated by the Travel Direction arrow. The behavior model of FIG. 8 demonstrates a multistep interaction between the follower vehicle and a human leader (Person), where the follower vehicle waits for a first door to be opened, passes through the first open door, waits for the leader to pass through the first open door, passes through a second open door, waits for the leader to pass through the second open door, and then resumes following the human (leader). For purposes of explanation, the imaginary centerline (CL) is shown passing though the doorway, where the centerline is perpendicular to the door in a closed position.

Table 8 below represents the behavioral model implemented by the follower vehicle, and includes follower vehicle stops, starts, pauses and movements in relation to modeled human leader stops, starts, pauses and movements in view of the encountered structural element. Therefore, Table 8 shows the series of steps taken by the follower vehicle in response to its interpretation of human behavior and environmental structural elements, which can be sensed by the one or more sensors. In this embodiment, the structural element is a vestibule having a plurality of left swing-out doors. In Table 8, the Person approaches the first door, in step 1, and the follower vehicle approaches following the Person, in step 1, and eventually stops at distance away from the door. Table 8 goes on to outline steps taken by the human and then responsive steps taken by the follower vehicle, until the human and follower vehicle are both through the vestibule and the follower vehicle has resumed following the human leader. Responsive steps taken by the follower vehicle can embodied within logic executed by the follower vehicle, such as within program code or other computer instructions.

TABLE 8

| Vestibule, Left Swing-out Doors | |
| --- | --- |
| Follower Vehicle | Person |
| 1. Approaches door in follow state | 1. Approaches door |
| 2. Stops 1.8 m away from door | 2. Stops at arm's length of door handle |
| 3. Waits | 3. Grabs door handle with left hand and pushes to open door to the left |
| 4. Initiates vestibule behavior | 4. Opens door to about an 80° swing and makes a clockwise loop to stand slightly behind door. |
| 5. Moves forward towards CL of door | 5. Holds door open for follower vehicle to pass through |
| 6. Passes through door and veers to the right | 6. Waits |
| 7. At 0.5 m away from wall, veers to the left to align its line of site with second door and stops | 7. Waits |
| 8. Waits | 8. Grabs door handle with right hand and moves forward to push door closed |
| 9. Waits | 9. Makes a 45° counter-clockwise turn to face follower vehicle |
| 10. Waits | 10. Turns to face the door and moves forward to reach for the door handle |
| 11. Moves 0.5 m backwards to give user some space | 11. Grabs door handle with left hand, pushes door open and walks through |
| 12. Waits | 12. Opens door fully and makes a counter-clockwise loop to stand slightly behind it |
| 13. Moves forward towards center of door and aligns itself to pass through | 13. Holds door open for follower vehicle to pass through |
| 14. Turns right and moves along wall, about 0.59 m away from wall | 14. Waits |
| 15. Stops about 1.2 m away from CL of door and makes a 155° counter-clockwise turn | 15. Grabs door handle with right hand and moves forward to push door closed |
| 16. Waits | 16. Turns 90° counter-clockwise, looks at follower vehicle |
| 17. Resumes tracking | 17. Turns another 90° counter-clockwise to face forward |
| 18. Continues following | 18. Continues walking straight |

Figure 9:
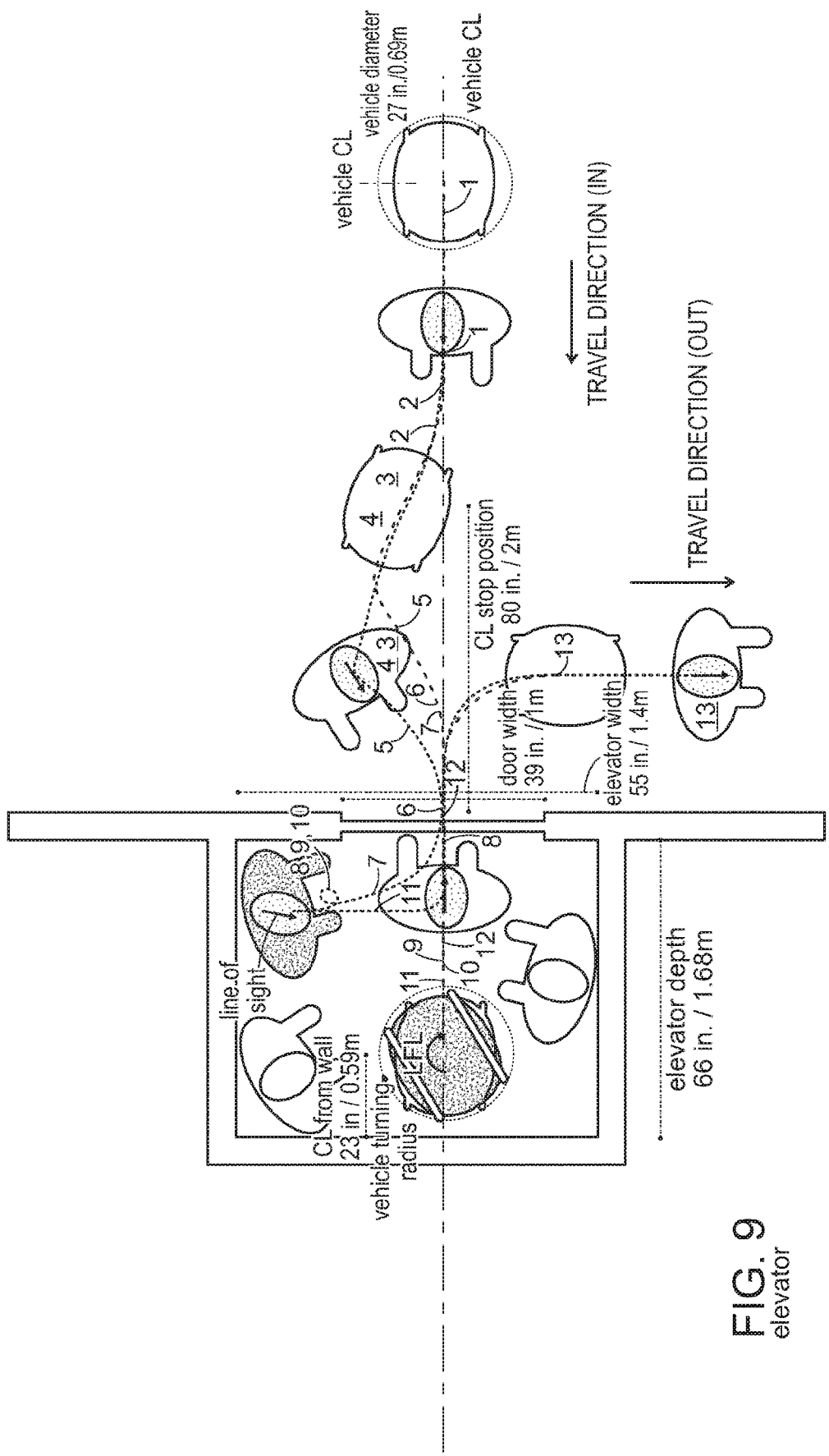
FIG. 9 is a flow diagram depicting an embodiment of a method of behavior-based navigation in and out of an elevator implemented by a self-driving companion vehicle, in accordance with aspects of the inventive concepts.

FIG. 9 is a flow diagram depicting an embodiment of a method of behavior-based navigation in and out of an elevator implemented by a self-driving vehicle, in accordance with aspects of the inventive concepts. In FIG. 9, travel is from right to left and the elevator includes at least one sliding door, as indicated by the Travel Direction arrow. The behavior model of FIG. 9 demonstrates a multistep interaction between the follower vehicle and a human leader (Person), where the follower vehicle waits for the elevator door to open, passes through the open door and moves to the back of the elevator, waits for the leader to pass through the open door, waits for the door to close and then re-open, and then resumes following the human (leader) out of the elevator once the elevator door re-opens. For purposes of explanation, the imaginary centerline (CL) is shown passing though the elevator doorway, where the centerline is perpendicular to the door in a closed position.

Table 9 below represents the behavioral model implemented by the follower vehicle, and includes follower vehicle stops, starts, pauses and movements in relation to modeled human leader stops, starts, pauses and movements in view of the encountered structural element. Therefore, Table 9 shows the series of steps taken by the follower vehicle in response to its interpretation of human behavior and environmental structural elements, which can be sensed by the one or more sensors. In this embodiment, the structural element is an elevator having at least one sliding door that opens on one side of the elevator. In Table 9, the Person approaches the elevator door, in step 1, and the follower vehicle approaches following the Person, in step 1, and eventually stops at distance away from the door. Table 9 goes on to outline steps taken by the human and then responsive steps taken by the follower vehicle, until the human and follower vehicle are both in and out of the elevator and the follower vehicle has resumed following the human leader. Responsive steps taken by the follower vehicle can embodied within logic executed by the follower vehicle, such as within program code or other computer instructions.

The embodiments of FIGS. 1-9 are not intended to be exhaustive. As will be appreciated by those skilled in the art, having the benefit of this disclosure, other behavior models can be defined for accommodating a cooperative negotiation of other structural elements, e.g., an elevators with doors on opposite sides, vestibules with one swing-in door and one swing-out door, and so on.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

It is appreciated that certain features of the invention, which are, for clarity, described in the context of separate embodiments, may also be provide in combination in a single embodiment. Conversely, various features of the invention which are, for brevity, described in the context of a single embodiment may also be provided separately or in any suitable sub-combination.

For example, it will be appreciated that all of the features set out in any of the claims (whether independent or dependent) can combined in any given way.

What is claimed is:

1. A method of modeling behavior for a self-driving vehicle, comprising:
tracking and measuring leader-follower interactions and actions with at least one structural element of an environment, including human leader behaviors and cooperative robot follower behaviors;
representing the leader behaviors and the follower behaviors in a behavior model; and
electronically storing the behavioral model,

TABLE 9

Elevator (sliding door)

| Follower Vehicle | Person |
| --- | --- |
| 1. Follows user approaching elevator door | 1. Approaches elevator door |
| 2. Veers to the right along with user | 2. Veers to the right towards elevator button |
| 3. Stops 2 m away from door | 3. Presses the elevator button |
| 4. Waits | 4. Remains on the right of elevator door and waits for it to open |
| 5. Follows user towards center of door opening | 5. Once door is open, approaches door at angle to center body with door opening |
| 6. Initiates elevator behavior. Centers itself to the elevator door | 6. Enters elevator |
| 7. Notes direction to which user turned after entering | 7. Turns to the right for elevator control buttons |
| 8. Proceeds to enter and moves to back of elevator | 8. Holds door open for follower vehicle to enter |
| 9. Since user turned right, follower vehicle turns clockwise towards the right | 9. Lets go of elevator door |
| 10. Stays at position but turns to regain tracking of user and turns to keep tracking when user moves to different parts of the elevator | 10. Waits |
| 11. Turns with user to face door opening | 11. Prepares to exit elevator by moving to center and aligning with door opening |
| 12. Resumes following | 12. When door opens, proceeds to exit |
| 13. Follows user out and to the right | 13. Turns to the right and continues walking | wherein the behavioral model is executable by the self-driving vehicle to cooperatively navigate the at least one structural element as a follower vehicle, and wherein the behavioral model includes follower vehicle stops, starts, pauses and movements in relation to, but different from, modeled human leader stops, starts, pauses and movements to negotiate an encountered structural element.

2. The method of claim 1, comprising:
establishing a measurable interaction environment model for the at least one structural element.

3. The method of claim 1, comprising:
tracking a person, a vehicle, and object movements with respect to the at least one structural element.

4. The method of claim 1, comprising:
providing an electronic format for describing stops, starts, pauses, movements, and behaviors of the self-driving vehicle/follower with respect to the at least one structural element and the leader.

5. The method of claim 1, comprising:
measuring and modeling the at least one structural element, follower vehicle, and/or human movement includes using one or more of:
   film industry motion capture tools;
   stop action photography;
   filming and measuring vehicle and/or human movements; and/or
   motion sensors on vehicles and people.

6. The method of claim 1, wherein the at least one structural element comprises:
   at least one right swing-in door,
   at least one left swing-in door,
   at least one right swing-out door,
   at least one left swing-out door, and/or
   at least one sliding door.

7. The method of claim 1, wherein the vehicle is a mobile carrier comprising at least one storage compartment.

8. The method of claim 1, wherein the at least one structural element includes a door and the behavior model comprises computer executable logic that causes the vehicle following the leader to execute responsive behaviors, including:
   in response to the leader pausing at the door, the vehicle pausing and waiting for the door to open;
   in response to the door opening, the vehicle proceeding through the door and waiting for the leader;
   in response to the leader proceeding through the door, the vehicle resuming tracking of the leader; and
   the vehicle resuming following the leader.

9. The method of claim 8, wherein the vehicle proceeding through the door and waiting for the leader includes the vehicle moving aside and off a centerline of the door to wait for the leader.

10. The method of claim 1, wherein the at least one structural element includes a first door and a second door and the behavior model comprises computer executable logic that causes the vehicle following the leader to execute responsive behaviors, including:
   in response to the leader pausing at the first door, the vehicle pausing and waiting for the first door to open;
   in response to the first door opening, the vehicle proceeding through the first door and waiting for the leader;
   in response to the second door opening, the vehicle proceeding through the second door and waiting for the leader;
   in response to the leader proceeding through the second door, the vehicle resuming tracking of the leader; and
   the vehicle resuming following the leader.

11. The method of claim 10, wherein the vehicle proceeding through the first and/or the second door and waiting for the leader includes the vehicle moving aside and off a centerline of the first and/or second door to wait for the leader.

12. The method of claim 1, wherein the at least one structural element includes an elevator and the behavior model comprises computer executable logic that causes the vehicle following the leader to execute responsive behaviors, including:
   in response to the leader pausing at an elevator door, the vehicle pausing and waiting for the door to open;
   in response to the door opening, the vehicle proceeding through the door moving to the back of the elevator;
   in response to the leader proceeding through the door into the elevator, the vehicle resuming tracking of the leader; and
   the vehicle resuming following the leader out of the elevator.

13. A follower vehicle, comprising:
   a body;
   a drive system configured to navigate the body to follow a leader;
   a computer processor and computer storage device; and
   a behavior model executable by the processor to cause the vehicle to cooperatively navigate at least one structural element with the leader, wherein the behavioral model implemented by the follower vehicle includes follower vehicle stops, starts, pauses and movements in relation to, but different from, modeled human leader stops, starts, pauses and movements to negotiate each of the least one structural element.

14. The vehicle of claim 13, wherein the at least one structural element comprises at least one:
   right swing-in door,
   left swing-in door,
   right swing-out door,
   left swing-out door, and/or
   sliding door.

15. The vehicle of claim 13, wherein the vehicle is a mobile carrier comprising at least one storage compartment.

16. The vehicle of claim 13, wherein the at least one structural element includes a door and the behavior model is executable to cause the vehicle to:
   follow the leader;
   detect the leader paused at the door and in response pause and wait for the door to open;
   in response to the open door, proceed through the door and wait for the leader;
   in response to the leader proceeding through the door, resume tracking the leader; and
   resume following the leader.

17. The vehicle of claim 16, wherein the behavior model is executable to cause the vehicle to move aside and off a centerline of the door to wait for the leader.

18. The vehicle of claim 13, wherein the at least one structural element includes a first door and a second door and the behavior model is executable to cause the vehicle to:
   follow the leader;
   detect the leader paused at the first door and in response pause and wait for the first door to open;
   in response to the first door opening, proceed through the first door and wait for the leader;
   in response to the second door opening, proceed through the second door and wait for the leader;

in response to the leader proceeding through the second door, resume tracking the leader; and resume following the leader.

19. The vehicle of claim 18, wherein the behavior model is executable to cause the vehicle to move aside and off a centerline of the first and/or second door to wait for the leader.

20. The vehicle of claim 13, wherein the at least one structural element includes an elevator and the behavior model is executable to cause the vehicle to:

follow the leader;

detect the leader paused at the first door and in response pause and wait for the first door to open;

in response to the door opening, proceed through the door and move to the back of the elevator;

in response to the leader proceeding through the door into the elevator, resume tracking the leader; and resume following the leader out of the elevator.

21. A method of navigating a follower vehicle through at least one structural element, comprising:

providing at least one stored behavior model that embodies, for each of a plurality of defined structural elements, human leader behaviors and robot follower behaviors defining actions of the follower vehicle in response to actions of the leader related to the at least one structural element; and using at least one processor in combination with at least one sensor of the follower vehicle:

recognizing an encountered structural element and retrieving a behavioral model associated with the encountered structural element;

tracking the behavior of a leader with respect to the encountered structural element; and executing the behavior model to cause the vehicle to navigate the encountered structural element with the leader, including controlling the follower vehicle stops, starts, pauses and movements in relation to, but different from, modeled human leader stops, starts, pauses and movements to negotiate the encountered structural element.

22. The method of claim 21, wherein the at least one structural element includes a door and navigating the follower vehicle by executing the behavior model comprises:

the vehicle following the leader;

in response to the leader pausing at the door, the vehicle pausing and waiting for the door to open;

in response to the door opening, the vehicle proceeding through the door and waiting for the leader;

in response to the leader proceeding through the door, the vehicle resuming tracking of the leader; and the vehicle resuming following the leader.

23. The method of claim 22, wherein the vehicle proceeding through the door and waiting for the leader includes the vehicle moving aside and off a centerline of the door to wait for the leader.

24. The method of claim 21, wherein the at least one structural element includes a first door and a second door and navigating the follower vehicle by executing the behavior model comprises:

the vehicle following the leader;

in response to the leader pausing at the first door, the vehicle pausing and waiting for the first door to open;

in response to the first door opening, the vehicle proceeding through the first door and waiting for the leader;

in response to the second door opening, the vehicle proceeding through the second door and waiting for the leader;

in response to the leader proceeding through the second door, the vehicle resuming tracking of the leader; and the vehicle resuming following the leader.

25. The method of claim 24, wherein the vehicle proceeding through the first and/or the second door and waiting for the leader includes the vehicle moving aside and off a centerline of the first and/or second door to wait for the leader.

26. The method of claim 21, wherein the at least one structural element includes an elevator and navigating the follower vehicle by executing the behavior model comprises:

the vehicle following the leader;

in response to the leader pausing at an elevator door, the vehicle pausing and waiting for the door to open;

in response to the door opening, the vehicle proceeding through the door moving to the back of the elevator;

in response to the leader proceeding through the door into the elevator, the vehicle resuming tracking of the leader; and the vehicle resuming following the leader out of the elevator.

* * * * *